United States Patent
Harvey et al.

(10) Patent No.: US 10,773,833 B1
(45) Date of Patent: Sep. 15, 2020

(54) PANEL FOR USE IN A DEPLOYABLE AND CANTILEVERED SOLAR ARRAY STRUCTURE

(71) Applicant: MMA Design, LLC, Boulder, CO (US)

(72) Inventors: Thomas Jeffrey Harvey, Nederland, CO (US); Toby Justin Harvey, Nederland, CO (US); Ryan M. VanHalle, Golden, CO (US)

(73) Assignee: MMA DESIGN, LLC, Boulder, CO (US)

( * ) Notice: Subject to any disclaimer, the term of this patent is extended or adjusted under 35 U.S.C. 154(b) by 1168 days.

(21) Appl. No.: 14/447,350

(22) Filed: Jul. 30, 2014

Related U.S. Application Data

(63) Continuation-in-part of application No. 13/199,430, filed on Aug. 30, 2011, now Pat. No. 8,814,099.

(51) Int. Cl.
*B64G 1/44* (2006.01)
*H02S 30/10* (2014.01)
*H02S 30/20* (2014.01)
*B64G 1/22* (2006.01)

(52) U.S. Cl.
CPC .............. *B64G 1/443* (2013.01); *B64G 1/222* (2013.01); *H02S 30/10* (2014.12); *H02S 30/20* (2014.12)

(58) Field of Classification Search
CPC ........ B64G 1/222; B64G 1/443; B64G 1/503; B64G 2001/1092; B64G 2001/224; B64G 1/641; H02S 30/20; H02S 20/00
USPC ..................................................... 244/172.6
See application file for complete search history.

(56) References Cited

U.S. PATENT DOCUMENTS

| 3,010,372 A | 11/1961 | Lanford |
| 3,677,508 A | 7/1972 | Dillard et al. |
| 4,133,501 A | 1/1979 | Pentlicki |
| 4,155,524 A * | 5/1979 | Marello ................. B64G 1/443 136/245 |
| 4,375,878 A | 3/1983 | Harvey |

(Continued)

FOREIGN PATENT DOCUMENTS

| EP | 0957536 A1 | 11/1999 |
| EP | 1043228 B1 | 3/2003 |

(Continued)

OTHER PUBLICATIONS

MMA Design LLC "eHaWK 27A-84FV".

(Continued)

*Primary Examiner* — Joseph W Sanderson
(74) *Attorney, Agent, or Firm* — Holzer Patel Drennan

(57) ABSTRACT

A panel structure for use in a deployable and cantilevered solar array structure is provided. A panel includes first and second planar panel sections and an intermediate panel section connecting the first and second sections. The planar panel sections are capable of being situated with respect to one another so as to have a V-tent-like shape when the panel is in a deployed state and to be coplanar when the panel is in a stowed state. When in the V-tent-like shape, the intermediate section of the panel extends in a straight line that is collinear or parallel to the longitudinal axis of the cantilevered solar array structure when deployed. The V-tent-like shape produces A panel structure that has a relatively high moment of inertia, is stiff, and can provide a large area for supporting solar cells.

23 Claims, 24 Drawing Sheets

(56) References Cited

U.S. PATENT DOCUMENTS

| | | | |
|---|---|---|---|
| 4,815,525 A | 3/1989 | Readman | |
| 5,040,907 A | 8/1991 | Harvey | |
| 5,131,955 A | 7/1992 | Stern et al. | |
| 5,189,773 A | 3/1993 | Harvey | |
| 5,228,644 A | 7/1993 | Garriott | |
| 5,298,085 A | 2/1994 | Harvey | |
| 5,296,044 A | 3/1994 | Harvey | |
| 5,365,241 A | 11/1994 | Williams | |
| 5,520,747 A | 5/1996 | Marks | |
| 5,644,322 A | 7/1997 | Hayes | |
| 5,785,280 A * | 7/1998 | Baghdasarian | B64G 1/222 136/245 |
| 5,857,648 A | 1/1999 | Dailey et al. | |
| 6,010,096 A | 1/2000 | Baghdasarian | |
| 6,017,002 A | 1/2000 | Burke | |
| 6,081,234 A | 6/2000 | Huang | |
| 6,147,294 A | 11/2000 | Dailey et al. | |
| 6,175,989 B1 * | 1/2001 | Carpenter | B64G 1/222 136/245 |
| 6,217,975 B1 | 4/2001 | Daton-Lovett | |
| 6,384,787 B1 | 5/2002 | Kim | |
| 6,437,232 B1 * | 8/2002 | Dailey | B64G 1/222 136/245 |
| 6,581,883 B2 | 6/2003 | McGee | |
| 6,784,359 B2 * | 8/2004 | Clark | B64G 1/222 136/245 |
| 6,970,143 B2 | 11/2005 | Allen | |
| 6,983,914 B2 | 1/2006 | Stribling | |
| 7,026,541 B2 | 4/2006 | Heidrich | |
| 7,030,824 B1 | 4/2006 | Taft | |
| 7,602,349 B2 | 10/2009 | Hentosh | |
| 8,289,221 B1 | 10/2012 | Finucane | |
| 8,356,774 B1 | 1/2013 | Banik | |
| 8,720,830 B1 | 5/2014 | Szatkowski | |
| 8,757,554 B1 | 6/2014 | Harvey | |
| 8,814,099 B1 | 8/2014 | Harvey | |
| 8,816,187 B1 | 8/2014 | Stribling | |
| 8,905,357 B1 | 12/2014 | Harvey | |
| 9,214,892 B2 | 12/2015 | White | |
| 9,270,021 B1 | 2/2016 | Harvey | |
| 9,528,264 B2 | 12/2016 | Freebury | |
| 9,550,584 B1 | 1/2017 | Harvey | |
| 9,593,485 B2 | 3/2017 | Freebury | |
| 9,840,060 B2 | 12/2017 | Francis | |
| 10,119,292 B1 | 11/2018 | Harvey | |
| 10,170,843 B2 | 1/2019 | Thomson | |
| 10,211,535 B2 | 2/2019 | Rahmat-Samii | |
| 10,256,530 B2 | 4/2019 | Freebury | |
| 10,263,316 B2 | 4/2019 | Harvey | |
| 10,276,926 B2 | 4/2019 | Cwik | |
| 10,283,835 B2 | 5/2019 | Harvey | |
| 10,370,126 B1 | 8/2019 | Harvey | |
| 10,418,721 B2 | 9/2019 | Chattopadhyay | |
| 2003/0164186 A1 * | 9/2003 | Clark | B64G 1/222 136/245 |
| 2003/0192994 A1 | 10/2003 | Holemans | |
| 2007/0262204 A1 * | 11/2007 | Beidleman | B64G 1/222 244/172.6 |
| 2008/0217482 A1 | 9/2008 | Ellinghaus | |
| 2008/0283670 A1 | 11/2008 | Harvey | |
| 2009/0283132 A1 | 11/2009 | Huang | |
| 2010/0163684 A1 * | 7/2010 | Dando | B64G 1/222 244/172.6 |
| 2011/0210209 A1 * | 9/2011 | Taylor | B64G 1/222 244/172.6 |
| 2011/0315192 A1 | 12/2011 | Swatek et al. | |
| 2012/0235874 A1 | 9/2012 | Kwak | |
| 2012/0325975 A1 | 12/2012 | Boulanger | |
| 2014/0042275 A1 * | 2/2014 | Abrams | B64G 1/222 244/172.6 |
| 2016/0197394 A1 | 7/2016 | Harvey et al. | |
| 2017/0110803 A1 | 4/2017 | Hodges | |
| 2018/0128419 A1 | 5/2018 | Brown | |
| 2018/0203225 A1 | 7/2018 | Freebury | |
| 2018/0244405 A1 | 8/2018 | Brown | |
| 2018/0297724 A1 | 10/2018 | Harvey | |
| 2019/0027835 A1 | 1/2019 | Hoyt | |
| 2019/0063892 A1 | 2/2019 | Brown | |
| 2019/0237859 A1 | 8/2019 | Freebury | |

FOREIGN PATENT DOCUMENTS

| | | |
|---|---|---|
| EP | 3059800 B1 | 8/2017 |
| WO | 2018005532 A1 | 1/2018 |
| WO | 2018191427 A1 | 10/2018 |
| WO | 2019171062 A1 | 12/2019 |

OTHER PUBLICATIONS

MMA Design LLC "eHaWK 27AS112".

MMA Design LLC "HaWK 17A-42".

MMA Design LLC "HaWK 17AB36".

MMA Design LLC "HaWK 17AS42".

MMA Design "HaWK 17AS56".

MMA Design LLC "T-DaHGR X-Band Antenna for CubeSats—1-meter diametere aperture deployed from 1U", 2019 CubeSat Workshop, Apr. 2019.

MMA Design LLC "Our Missions" https://mmadesignllc.com/about/missions/.

MMA Design LLC "P-DaHGR Antenna" https://mmadesignllc.com/product/p-dahgr-antenna/.

MMA Design LLC "R-DaHGR" https://mmadesignllc.com/product/large-aperture-rigid-array-lara/.

MMA Design LLC "Research Grant Awards" https://mmadesignllc.com/about/research-grant-awards/.

MMA Design LLC "rHaWK Solar Array" https://mmadesignllc.com/product/r-hawk-solar-array/.

MMA Design LLC T-DaHGR Antenna' https://mmadesignllc.com/product/t-dahgr-antenna/.

Sheldahl, Product Bulletin, Novaclad G2 300.

Gatti et al., Low Cost Active Scanning Antenna for Mobile Satellite Terminals, University of Perugia, Dept. Electronic and Information Engineering.

Fang Huang, Analysis and Design of Coplanar Waveguide-Fed Slot Antenna Array, IEEE Transactions on Antennas and Propagation, vol. 47, No. 10, Oct. 1999.

MasterSil 155 Mastere Bond Polymer System, MasterSil 155 Technical Data Sheet.

Eccosorb HR Lightweight, Open-cell, Broadband Microwave Absorber, Laird.

Single Wires ESCC 3901018, Axon Cable & interconnect.

ESCC Cables & harnesses made by Axon, Axon Cable & interconnect.

Rahmat-Samii, Ka Band Highly Constrained Deployable Antenna for RalnCube.

Murphy, Tyler et al., PEZ: Expanding CubeSat Capabilities through Innovative Mechanism Design, 25th Annual AIAA/USU Conference on Small Satellites.

Khayatian, Behrouz et al. "Radiation Characteristics of Reflectarray Antennas: Methodology and Applicatios to Dual Configurations", Jet Propulsion Laboratory.

Fang, Houfei 'Thermal Distortion Analyses of a Three-Meter Inflatable Reflectarray Antenna, Jet Propulsion Laboratory.

Jones, P. Alan, et al. "Spacecraft Solar Array Technology Trends", AEC-Able Engineering Company, Inc.

Jamaluddin, M.H. et al., "Design, Fabrication and Characterization of a Dielectric Resonator Antenna Reflectarray in Ka-Band", Progress in Electromagnetics Research B, vol. 25, 261-275, 2010.

Mierheim, Olaf, et al. "The Tape Spring Hinge Deployment System of the EU: Cropis Solar Panels", German Aerospace Center DLR.

Ferris et al, The Use, Evolution and Lessons Learnt of Deployable Static Solar Array Mechanisms. Proceedings of the 42nd Aerospace Mechanisms Symposium, NASA Goddard Space Flight Center, May 14-16, 2014.

"DARPA prototype reflectarray antenna offers high performance in small package", PHYSORG, Jan. 23, 2019.

(56) References Cited

OTHER PUBLICATIONS

Lele et al., Reflectarray Antennas, International Journal of Computer Applications, vol. 108, No. 3, Dec. 2014.
Cadogan et al., The Development of Inflatable Space Radar Reflectarrays, 40th AIAA/ASME/ASCE/AHS/ASC Structures, Structural Dynamics, and Materials (SDM) Conference, Apr. 12-15, 1999.
Klesh et al., MarCO: CubeSats to Mars in 2016, Jet Propulsion Laboratory, 29th Annual AIAA/USU Conference on Small Satellites.
Huang, John, Capabilities of Print cd Reflectarray Antennas, Jet Propulsion Laboratory, California Institute of Technology.
Huang, John, Review and Design of Printed Reflectarray Antennas, Jet Propulsion Laboratory, California Institute of Technology.
Zawadzki, Mark et al., Integrated RF Antenna and Solar Array for Spacecraft Application, Jet Propulsion Laboratory, California Institute of Technology.
Hand, Thomas, et al., Dual-Band Shared Aperture Reflector/Reflectarray Antenna Designs, Technologies and Demonstrations for NASA's ACE Radar.
Pacheco, Pedro et al., A Non-Explosive Release Device for Aerospace Applications Using Shape Memory Alloys.
Greco, Francesco et al., A Ka-Band Cylindrical Paneled Reflectarray Antenna, Jun. 10, 2019.
Carrasco, Eduardo et al., Reflectarray antennas: A review, Foundation for Research on Information Technologies in Society (IT'IS).
Zuckermandel, J. et al., Design, Build, and Testing of TacSat Thin Film Solar Arrays, MicroSat Systems, Inc., 20th Annual AIAA/USU Conference on Small Satellites.
Filippazzo, Giancarlo et al., The Potential Impact of Small Satellite Radar Constellations on Traditional Space Systems, 5th Federated and Fractionated Satellite Systems Workshop, Nov. 2-3, 2017.
De Boer, GaAs Mixed Signal Multi-Function X-Band Mmic with 7 Bit Phase and Amplitude Control and Integrated Serial to Parallel Converter, TNO Physics and Electronics Laboratory.
Grafmuller, et al, "The TerraSAR-X Antenna System", 2005 IEEE.
Gatti et al, Computation of Gain, Noise Figure, and Third-Order Intercept of Active Array Antennas. IEEE Transactions on Antennas and Propagation, vol. 52, No. 11, Nov. 2004.
Moreira, TerraSAR-X Upgrade to a Fully Polarimetric Imaging Mode. German Aerospace Center (DLR), Jan. 16, 2003.
Smith et al., Coplanar Waveguide Feed for Microstrip Patch Antennas. Electronics Letters, vol. 28, No. 25. Dec. 3, 1992.
Gatti et al., A Novel Phase-Only Method for Shaped Beam Synthesis and Adaptive Nulling. University of Perugia, Dept. Electronic and Information Engineering.
Mencagli et al., Design of Large MM-Wave Beam-Scanning Reflectarrays. University of Perugia, Dept. Electronic and Information Engineering.
Sorrentino et al., Beam Steering Reflectarrays. University of Perugia.
Kim et al., Spaceborne SAR Antennas for Earth Science.
Marcaccioli et al., Beam Steering MEMS mm-Wave Reflectarrays. University of Perugia, Dept. of Information and Electronic Engineering.
Sorrentino et al., Electronic Reconfigurable MEMS Antennas. University of Perugia, Dept. of Electronic and Information Engineering.
Bachmann et al., TerraSAR-X In-Orbit Antenna Model Verification Results. German Aerospace Center (DLR).
Bialkowski et al., Bandwidth Considerations for a Microstrip Reflectarray. Progress in Electromagnetics Research B, vol. 3, 173-187, 2008.
Mikulas et al., Tension Aligned Deployable Structures for Large 1-D and 2-D Array Applications. 49th AIAA/ASME/ASCE/AHS/ASC Structures, Structural Dynamics and Materials Conference, Apr. 7-10, 2008.
Freeman et al., On the Use of Small Antennas for SAR and SAR Scatterometer Systems.
Gatti et al., Scattering Matrix Approach to the Design of Infinite Planar Reflectarray Antennas. DIEI, University of Perugia.
Ebadi et al., Linear Reflectarray Antenna Design Using 1-bit Digital Phase Shifters. D.I.E.I. University of Perugia.
Ebadi et al., Near Field Focusing in Large Reflectarray Antennas Using 1-bit Digital Phase Shifters. DIEI, University of Perugia.
Sorrentino et al., Recent Advances on Millimetre Wave Reconfigurable Reflectarrays. DIEI, University of Perugia.
Chen et al., Fully Printed Phased-Array Antenna for Space Communications.
Gatti et al., Millimetre Wave Reconfigurable Reflectarrays. RF Microtech, a spin-off of the University of Perugia, c/o DIEI.
Montori et al., Constant-Phase Dual Polarization MEMS-Based Elementary Cell for Electronic Steerable Reflectarrays. University of Perugia, Dept. of Electronic and Information Engineering.
Marcaccioli et al., RF MEMS-Reconfigurable Architectures for Very Large Reflectarray Antennas. Dept. of Electronic and Information Engineering, University of Perugia.
Carrasco et al., Dual-polarization reflectarray elements for Ku-band Tx/Rx portable terminal antenna. RF Microtech.
Mencagli et al., Design and Realization of a MEMS Tuneable Reflectarray for mm-wave Imaging Application. University of Perugia, DIEI.
Younis, et al, A Concept for a High Performance Reflector-Based X-Band SAR. German Aerospace Center (DLR), Microwaves and Radar Institute.
Montori et al., Design and Measurements of a 1-bit Reconfigurable Elementary Cell for Large Electronic Steerable Reflectarrays. Dept. of Electronic and Information Engineering.
Montori et al., 1-bit RF-MEMES-Reconfigurable Elementary Cell for Very Large Reflectarray. Dept. of Electronic and Information Engineering.
Moussessian et al., An Active Membrane Phased Array Radar. Jet Propulsion Laboratory, California Institute of Technology.
Fisher, Phased Array Feeds for Low Noise Reflector Antennas. Electronics Division Internal Report No. 307, Sep. 24, 1996.
Montori et al., Wideband Dual-Polarization Reconfigurable Elementary Cell for Electronic Steerable Reflectarray at Ku-Band. University of Perugia, Dept. of Electronic and Information Engineering.
Gannudi et al., Preliminary Design of Foldable Reconfigurable Reflectarray for Ku-Band Satellit4e Communication. University of Perugia, Dept. of Electronic and Information Engineering.
Tienda, et al., Dual-Reflectarray Antenna for Bidirectional Satellite Links in Ku-Band. European Conference on Antennas and Propagation, Apr. 11-15, 2011.
Lane et al., Overview of the Innovative Space-Based Radar Antenna Technology Program. Journal of Spacecraft and Rockets. vol. 48, No. 1. Jan.-Feb. 2011.
Devireddy et al., Gain and Bandwidth Limitations of Reflectarrays. Dept. of Eletrical Engineering. ACES Journal, vol. 26, No. 2. Feb. 2011.
Knapp et al., Phase-Tilt Radar Antenna Array. Dept. of Electrical and Computer Engineering, University of Massachusetts.
Moussessian et al., Large Aperture, Scanning, L-Band SAR (Membrane-based Phased Array). 2011 Earth Science Technology Forum.
Arista et al., Reskue Project: Transportable Reflectarray Antenna for Satellite Ku-Band Emergency Communications.
DuPont Kapton, Polyimide Film. General Specifications.
Footdale et al., Static Shape and Modal Testing of a Deployable Tensioned Phased Array Antenna. 53rd AIAA/ASME/ASCE/AHS/ASC Structures, Structural Dynamics and Materials Conference. Apr. 23-26, 2012.
Montori et al., Reconfigurable and Dual-Polarization Folded Reflectarray Antenna. Dept. of Electronic and Information Engineering. University of Perugia.
Zebrowski, Illumination and Spillover Efficiency Calculations for Rectangular Reflectarray Antennas. High Frequency Electronics.
Jeon et al., Structural Determinancy and Design Implications for Tensioned Precision Deployable Structures. 54th AIAA/ASME/ASCE/AHS/ASC Structures, Structural Dynamics, and Materials Conference. Apr. 8-11, 2013.
Bachmann et al., TerraSAR-X Antenna Calibration and Monitoring Based on a Precise Antenna Model.
Hum et al., Reconfigurable Reflectarrays and Array Lenses for Dynamic Antenna Beam Control: A Review. IEEE Transactions on Antennas and Propagation. Aug. 21, 2013.

(56) References Cited

OTHER PUBLICATIONS

Hodges et al., ISARA Integrated Solar Array Reflectarray Mission Overview. Jet Propulsion Laboratory. California Institute of Technology. Aug. 10, 2013.
Cooley, Michael "Phased Array-Fed Reflector (PAFR) Antenna Architectures for Space-Based Sensors." Northtrop Grumman Electronic Systems. 2015.
FedBizOpps, Cubesat Solar Sail Systems—ManTech/Nexolve. Oct. 25, 2013.
Metzler, Thomas "Design and Analysis of a Microstrip Reflectarray". University of Massachusetts. 1993.
Synak, Aleksander "Erasmus Student Exchange Project: Design and Implementation of UHF Patch Antenna." Universitat Politecnica De Catalunya.
Warren et al., Large, Deployable S-Band Antenna for a 6U Cubesat. 29th Annual AIAA/USU Conference on Small Satellites.
Sauder et al., Ultra-Compact Ka-Band Parabolic Deployable Antenna for RADAR and Interplanetary CubeSats. 29th Annual AIAA/USU Conference on Small Satellites.
Kelly, A Scalable Deployable High Gain Reflectarray Antenna— DaHGR. MMA Design LLC.
Montori et al., A Transportable Reflectarray Antenna for Satelitte Ku-Band Emergency Communications. IEEE Transactions on Antennas and Propagation. vol. 63, No. 4, Apr. 2015.
Larranaga et al., On the Added Value of Quad-Pol Data in a Multi-Temporal Crop Classification Framework Based on RADARSAT-2 Imagery. Remote Sens. 2016, 8, 335.
Petkov et al., Charge Dissipation in Germanium-Coated Kapton Films at Cryogenic Temperatures. Jet Propulsion Laboratory. California Institute of Technology.
Sheldahl, Product Bulletin, Germanium Coated Polyimide.
Medina-Sanchez, Rafael "Beam Steering Control System for Low-Cost Phased Array Weather Radars: Design and Calibration Techniques". Doctoral Dissertations. University of Massachusetts. May 2014.
Eom et al., A Cylindrical Shaped-Reflector Antenna with a Linear Feed Array for Shaping Complex Beam Patterns. Progress in Electromagnetics Research. vol. 119, 477-495, 2011.
Lenz et al., Highly Integrated X-band Microwave Modules for the TerraSAR-X Calibrator.
Kumar et al., Design of a Wideband Reduced Size Microstrip Antenna in VHF/Lower UHF Range.
Giauffret et al., Backing of Microstrip Patch Antennas Fed by Coplanar Waveguides. 26th EuMC, Sep. 9-12, 1996.
Salazar et al., Phase-Tilt Array Antenna Design for Dense Distributed Radar Networks for Weather Sensing. IGARRS 2008.
Gatti et al., Slotted Waveguide Antennas with Arbitrary Radiation Pattern. University of Perugia.
Huber et al., Spaceborne Reflector SAR Systems with Digital Beamforming. IEE Transactions on Aerospace and Electronic Systems. vol. 48, No. 4. Oct. 2012.
Mejia-Ariza et al., "Ultra-Flexible Advanced Stiffness Truss (U-FAST)" AIAA SciTech Fourm. Jan. 4-8, 2016.
Rogers Corporation, Copper Foils for High Frequency Materials.
Younis et al., Performance Comparision of Reflector-and Planar-Ant4enna Based Digital Beam-Forming SAR. International Journal of Antennas and Propagation. vol. 2009.
Montori et al., Novel 1-bit Elementary Cell for Reconfigurable Reflectarray Antennas. Dept. of Electronic and Information Engineering. University of Perugia.
Gatti, Roberto "Pubblicazioni Reflectarrays".
Montori et al., W-band beam-steerable MEMS-based reflectarray. International Journal of Microwave and Wireless Technologies. Jul. 15, 2011.
Pehrson et al., Folding Approaches for Tensioned Precision Planar Shell Structures. AIAA SciTech Fourm. 2018 AIAA Spacecraft Structures Conference. Jan. 8-12, 2018.

Greschik et al., Error Control via Tension for an Array of Flexible Square Antenna Panels. 51st AIAA/ASME/ASCE/AHS/ASC Structures, Structural Dynamics, and Materials Conference. Apr. 12-16, 2010.
Greschik et al., Strip Antenna Figure Errors Due to Support Truss Member Length Imperfections. 45th AIAA/ASME/ASCE/AHS/ASC Structures, Structural Dynamics and Materials Conference. Apr. 19-22, 2004.
DuPont Kapton 200EN Polyimide Film, 50 Micron Thickness. http://www.matweb.com/search/datasheet_print.aspx?matguid=305905ff1ded40fdaa34a18d8727a4dc.
Cassini Program Environmental Impact Statement Supporting Study, vol. 2: Alternate Mission and Power Study. Jet Propulsion Laboratory, California Institute of Technology, Jul. 1994.
Military Specification. Assemblies, Moving Mechanical, for Space and Launch Vehicles, General Specification for. Apr. 18, 1988.
Dearborn, Michael et al., A Deployable Membrane Telescope Payload for CubeSats. JoSS, vol. 3, No. 1, pp. 253-264.
Engberg, Brian et al., A High Stiffness Boom to Increase the Moment-ARM for a Propulsive Attitude Control System on FalconSat-3. 17th Annual AIAA/USU Conference on Small Satellites. 2003.
Arya, Manan, Wrapping Thick Membranes with Slipping Folds. California Institute of Technology. American Institute of Aeronautics and Astronautics. 2015.
Guest, S.D., et al., Inextensional Wrapping of Flat Membranes. Department of Engineering, University of Cambridge. 1992.
Luo, Qi, et al., Design and Analysis of a Reflectarray Using Slot Antenna Elements for Ka-band SatCom. IEEE Transactions on Antennas and Propagation, vol. 63, No. 4. Apr. 2015.
Leipold, M. et al., Large SAR Membrane Antennas with Lightweight Deployable Booms. 28th ESA Antenna Workshop on Space Antenna Systems and Technologies, ESA/ESTEC, May 31-Jun. 3, 2005.
Fang, Houfei, et al., In-Space Deployable Reflectarray Antenna: Current and Future. American Institute of Aeronautics and Astronautics. 2008.
Rauschenbach, H.S. et al., Solar Cell Array Design Handbook. vol. 1. Jet Propulsion Laboratory. California Institute of Technology. Oct. 1976.
Triolo, Jack, Thermal Coatings Seminar Series Training. Part 1: Properties of Thermal Coatings. NASA GSFC Contamination and Coatings Branch—Code 546. Aug. 6, 2015.
Huang, John, et al., A 1-m X-band Inflatable Reflectarray Antenna. Jet Propulsion Laboratory. California Institute of Technology. Jun. 24, 1998.
Belvin, W., et al., Advanced Deployable Structural Systems for Small Satellites. Sep. 2016.
Cesar-Auguste, Virginie, et al., An Investigation of Germanium Coated Black Kapton and Upilex Films Under Different Environmental Ground Conditions. 2009.
Pacette, Paul E. et al., A Novel Reflector/Reflectarry Antenna. An Enabling Technology for NASA's Dual-Frequency ACE Radar. Jun. 14, 2012.
Liu, ZhiQuan, et al., Review of Large Spacecraft Deployable Membrane Antenna Structures. Feb. 28, 2017.
Sheldahl A Multek Brand, The Red Book. 2019.
EoPortal Directory, FalconSat-7. Satellite Missions. https://directory.eoportal.org/web/eoportal/satellite-missions/f/falconsat-7. 2020.
Finckenor, Miria et al., Results of International Space Station Vehicle Materials Exposed on MISSE-7B. Jun. 27, 2012.
Kurland, Richard et al., Current Results From the Advanced Photovoltaic Solar Array (APSA) Program. Aug. 9, 1993.
Bron Aerotech, Aerospace Material to Spec. 2020.
Straubel, Marco, Design and Sizing Method for Deployable Space Antennas, Dissertation. Jul. 2, 2012.
Biddy, Chris et al., LightSail-1 Solar Sail Design and Qualification. 41st Aerospace Mechanisms Symposium, Jet Propulsion Laboratory, May 16-18, 2012.
Murphey, Thomas W. et al., Tensioned Precision Structures. Air Force Research Laboratory. Jul. 24, 2013.
Kiziah, Rex, et al., Air Force Academy Department of Physics Space Technologies Development and Research. 30th Space Symposium, Technical Track, May 21, 2014.

(56) References Cited

OTHER PUBLICATIONS

Smith, Brian FalconSAT-7 Deployable Solar Telescope. United States Air Force Academy. Space Physics and Atmospheric Research Center. Aug. 5, 2014.
Dearborn, Michael et al., A Deployable Membrane Telescope Payload for CubeSats. JoSS, vol. 3, No. 1, pp. 253-264. 2014.
Sheldahl A Multek Brand, Product Bulletin. Germanium Coated Polyimide. 2020.
P. Keith Kelly, A Scalable Deployable High Gain Antenna—DaHGR. 30th Annual AIAA/USU Conference on Small Satellites. 2016.
P. Keith Kelly, A Scalable Deployable High Gain Antenna—DaHGR. Powerpoint. 2016.
Mooney, C. et al., STAMET—A Materials Investigation. CNES. 2020.
Su Xiaofeng, et al., Wrinkling Analysis of a Kapton Square Membrane under Tensile Loading. 44th AIAA/ASME/ASCE/AHS Structures, Structural Dynamics, and Materials Conference. Apr. 7-10, 2003.
Huang, John et al., Reflectarry Antennas. IEEE Press. 2008.
European Search Report for European Patent Appl. No. 16155768.1, dated Jul. 15, 2016.
Focatiis et al., Deployable Membranes Designed from Folding Tree Leaves, Philosophical Transactions of the Royal Society of London A, 2002, pp. 1-12, The Royal Society.
Guest et al., Inextensional Wrapping of Flat Membranes, Proceedings of the First International Seminar on Structural Morphology, Sep. 7-11, 1992, pp. 203-215.
Im et al., Prospects of Large Deployable Reflector Antennas for a New Generation of Geostationary Doppler Weather Radar Satellites, AIAA Space 2007 Conference & Exposition, Sep. 18-20, 2007, pp. 1-11, American Institute of Aeronautics and Astronautics, Inc.
Mallikarachchi, Thin—Walled Composite Deployable Booms withTape—Spring Hinges, May 2011, pp. 1-181, University of Cambridge.
Thomson, Mechanical vs. Inflatable Deployable Structures for Large Apertures or Still No Simple Answers, Nov. 10-11, 2008, pp. 1-24, Keck Institute for Space Sciences.
Huang et al., Reflectarray Antennas, Oct. 2007, pp. ii-xii, 1-7, 9-26, 112-118, 137-143, 182-193 and 201 205.
Arya, Wrapping Thick Membranes with Slipping Folds, American Institute of Aeronautics and Astronautics, California Institute of Technology.
Biddy et al., LightSail-1 Solar Sail Design and Qualification, May 2012, pp. 451-463, Proceedings of the 41st Aerospace Mechanisms Symposium, Jet Propulsion Laboratory.
John Wiley & Sons, Inc .CubeSat Design Specification Rev 13, Feb. 20, 2014, pp. 1-42, California Polytechnic State University.
Cesar-Auguste et al., An Investigation of Germanium Coated Black Kapton and Upilex Films under Different Environmental Ground Conditions, ESA-ESTEC, Materials Technology Section, The Netherlands.
Dearborn et al., A Deployable Membrane Telescope Payload for CubeSats, JoSS, vol. 3, No. 1., pp. 253-264.
Demaine, Geometric Folding Algorithms: Linkages, Origami, Polyhedra, Fall 2010.
Demaine et al., Geometric Folding Algorithms, Feb. 2007.
Fang, et al., In-Space Deployable Reflectarray Antenna: Current and Future, American Institute of Aeronautics and Astronautics.
Kelly, A Scalable Deployable High Gain Antenna-DaHGR, 30th Annual AIAA/USU, Conference on Small Satellites.
Kiziah et al., Air Force Academy Department of Physics Space Technologies Development and Research, May 2014, 30th Space Symposium.
Leipold et al., Large SAR Membrane Antennas with Lightweight Deployable Booms, Jun. 2005, 28th ESA Antenna Workshop on Space Antenna Systems and Technologies.
Shaker et al., Reflectarray Antennas Analysis, Design, Fabrication, and Measurement, Book, 2014, Artech House.
Stella et al., Current Results From the Advanced Photovoltaic Solar Array (APSA) Program.
Straubel, Design and Sizing Method for Deployable Space Antennas, Dissertation, Jul. 2012.
Su et al., Wrinkling Analysis of a Kapton Square Membrane under Tensile Loading, Apr. 2003.
Triolo, NASA Technical Reports Server (NTRS) 20150017719: Thermal Coatings Seminar Series Training Part 2: Environmental Effects, Aug. 2015.
Huang, The Development of Inflatable Array Antennas, Jet Propulsion Laboratory, California Institute of Technology.
Huang et al., Inflatable Microstrip Reflectarray Antennas at X and Ka-band Frequencies, Jul. 1999.
Huang et al., A One-Meter X-Band Inflatable Reflectarray Antenna, Jet Propulsion Laboratory, California Institute of Technology.
Integrated Solar Array and Reflectarray Antenna (ISARA), National Aeronautics and Space Admnistration (NASA), May 3, 2013.
MacGillivray, Charles, "Miniature Deployable High Gain Antenna for CubeSats", Apr. 2011.
Military Specification (MIL)-A-83577B (USAF), Assemblies, Moving Mechanical, for Space and Launch Vehicles, General Specification for (DOD, Mar. 15, 1978).
TRW Engineering & Test Division, (1990) Advanced Photovoltaic Solar Array Prototype. Fabrication, Phase IIB, JPL Contract No. 957990 (Mod 6), TRW Report No. 51760-6003-UT-00.
"Capella Space closes $19M Series B to deliver reliable Earth Observation data on demand", Capella Space, Sep. 26, 2018.
"Capella Space", GlobalSecurity.org, https://www.globalsecurity.org/space/systems/capella.htm.
Fernholz, Tim, "Silicon Valley is investing $19 million in space radar", Quartz, Sep. 29, 2018.
Werner, Debra "Capella's First Satellite launching this fall", Spacenews, Aug. 8, 2018.
Capella Space is First American Company to Send Advanced Commercial Radar Satellite to Space', Markets Insider, Dec. 3, 2018.
"Capella X-SAR (Synthetic Aperture Radar) Constellation", eoPortal Directory.
Banazedehm, Payam "Prepare to Launch [Entire Talk]", Stanford eCorner, Aug. 5, 2019.
Kamra, Deepak "Capella Space—Getting the Full Picture", Canaan, Jan. 7, 2017.
"Capella Space Corporation—Testing the First Commercial U.S. SAR Satellite".
Werner, Debra "Capella Space gets ready for primetime as constellation operator", Spacenews, Jun. 3, 2019.
Capella Space "The Capella 36".
MMA Design LLC "Another MMA HaWk Takes Flight" https://mmadesignllc.com/2019/05/sparc-1-hawks-take-flight/.
MMA Design LLC "FalconSAT-7 Finally Earns its Wings!" https://mmadesign.com/2019/07/falconsat-7-finally-earns-its-wings/.
MMA Design LLC "Customize Your HaWK" https://mmadesignllc.com/customize-your-hawk/.
MMA Design LLC "Asteria'S HaWK solar arrays successfully deploy in space!" https://mmadesignllc.com/2018/01/asteria-hawk-deploys-in-space/.
MMA Design LLC "MarCO HaWKs Headed to Mars!" https://mmadesignllc.com/2018/05/marco-mission-hawks-poised-for-launch-2/.
MMA Design LLC "JPL's ASTERIA wins SmallSat Mission of the Year!" https.
MMA Design LLC "MarCO Mission HaWKs poised for launch!" https://mmadesignllc.com/2018/04/marco-mission-hawks-poised-for-launch/.
MMA Design LLC "MarCO Mission's twin CubeSats rule the headlines" https://mmadesignllc.com/2018/11/marco-rules-the-headlines/.
MMA Design LLC "MMA Solar Arrays Launch on ASTERIA CubeSat!" https://mmadesignllc.com/2017/08/asteria-launch/.

\* cited by examiner

Deployable Morphing Modular Solar Array
(Stowed Condition)

Deployable Morphing Modular Solar Array
(8 Petal Version, Deployed Condition)

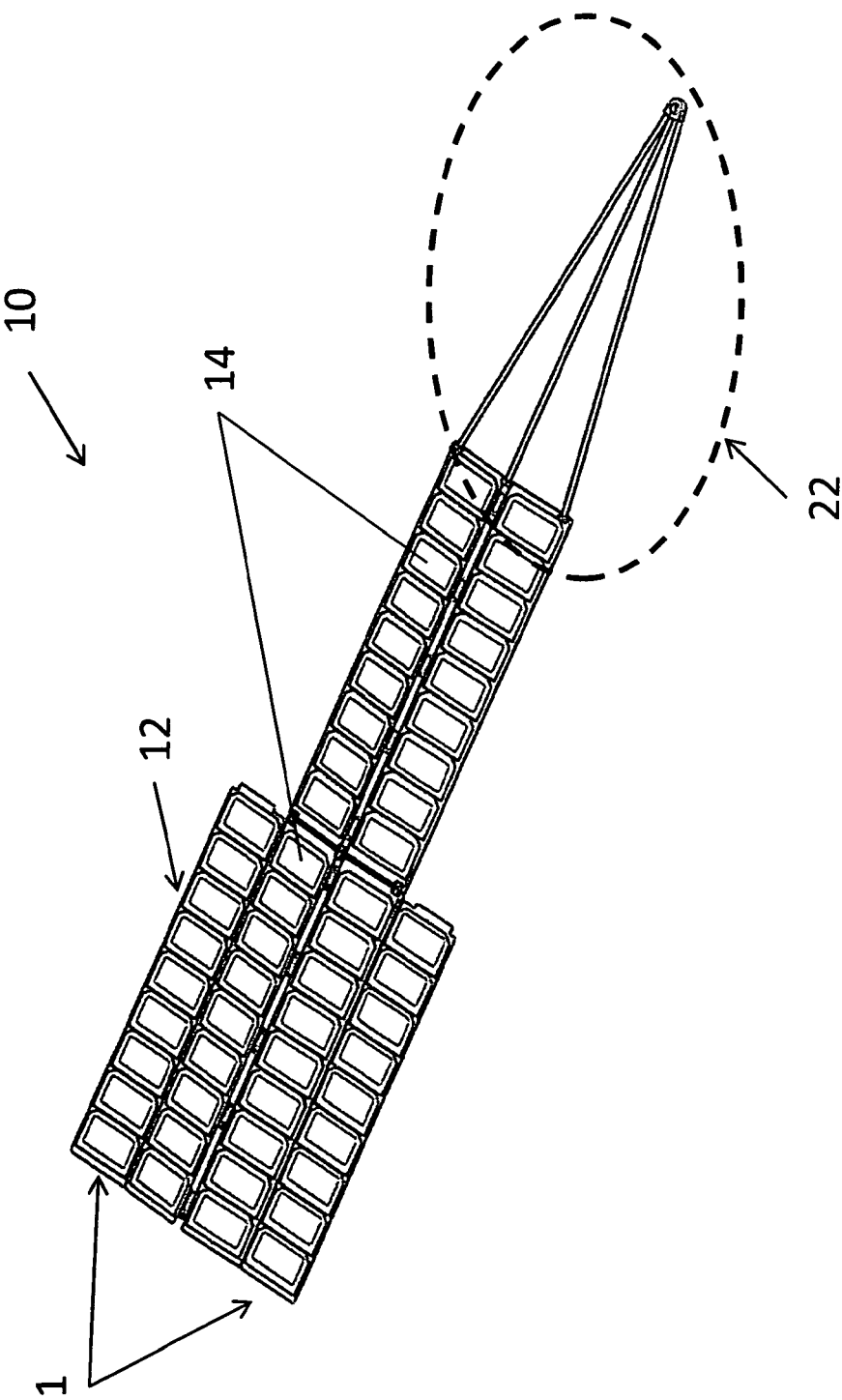

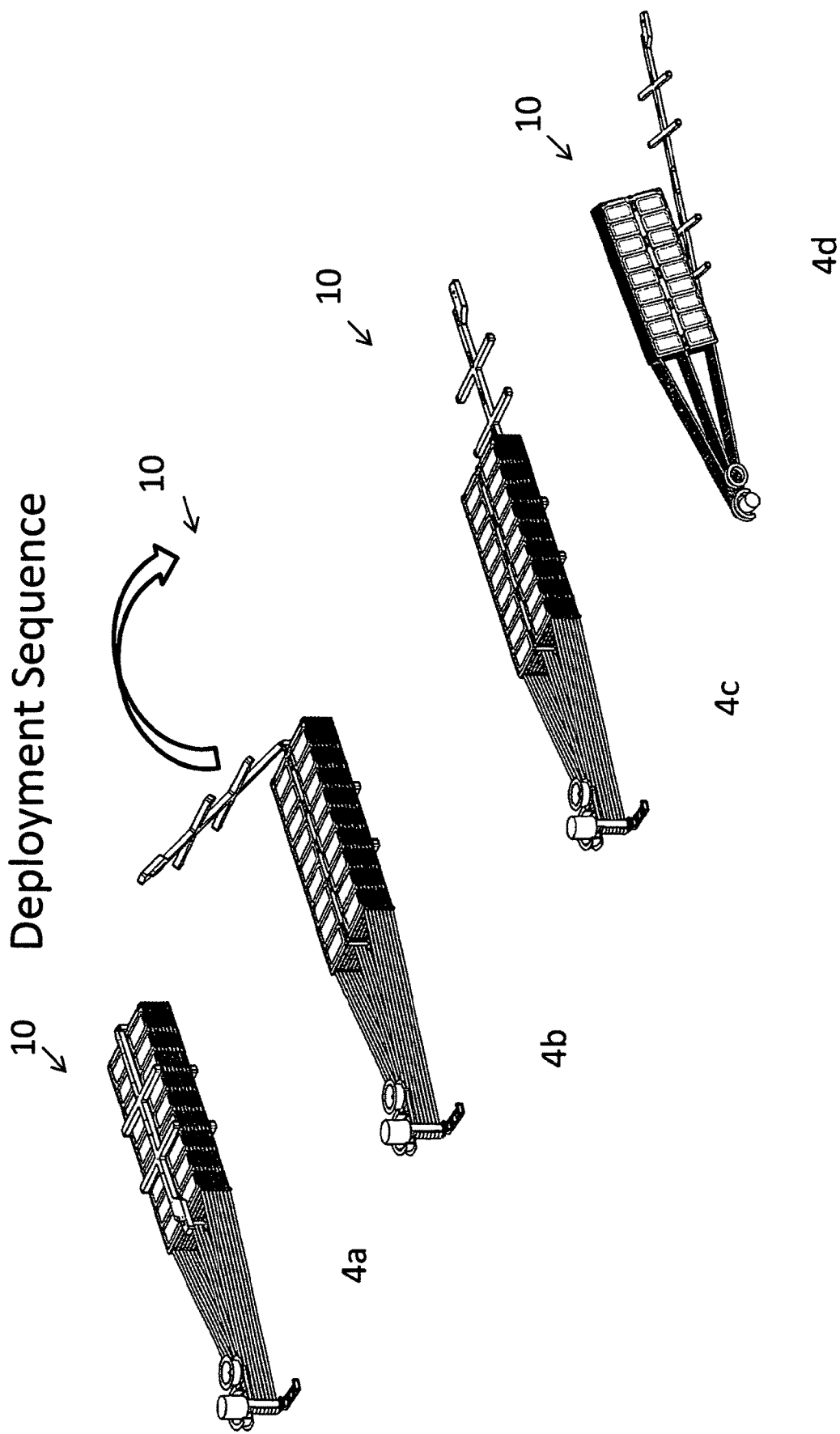

Figure 4 (cont.)
Deployment Sequence

4e

4f

4g

4h

Root Staging and Deployment Mechanism

V Bow Of Solar Panel

Deployable Morphing Modular Solar Power Assemblies
(DMMSA Stowed Stack Section)

Deployable Morphing Modular Solar Array
(Prior to Deployment)

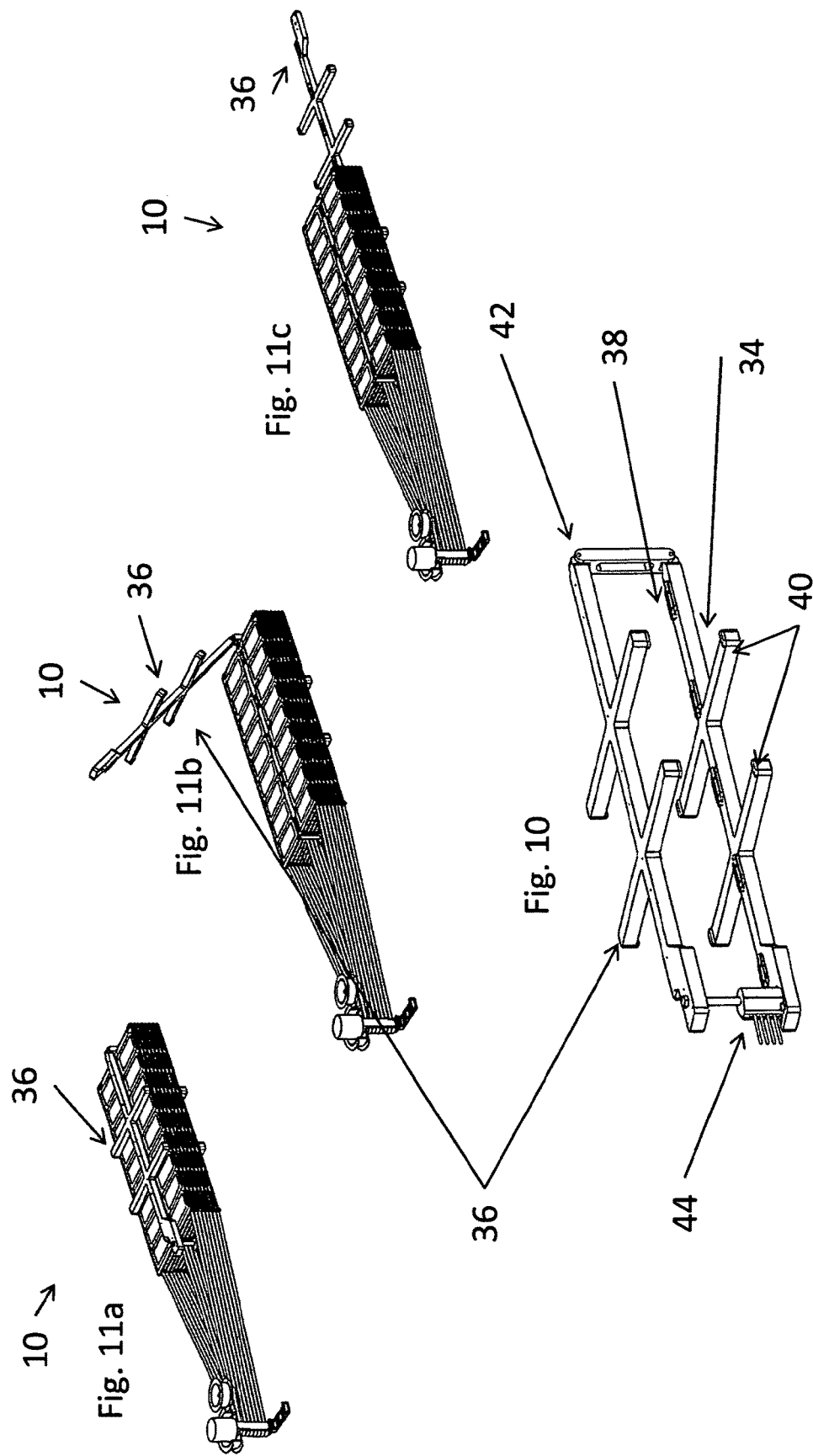

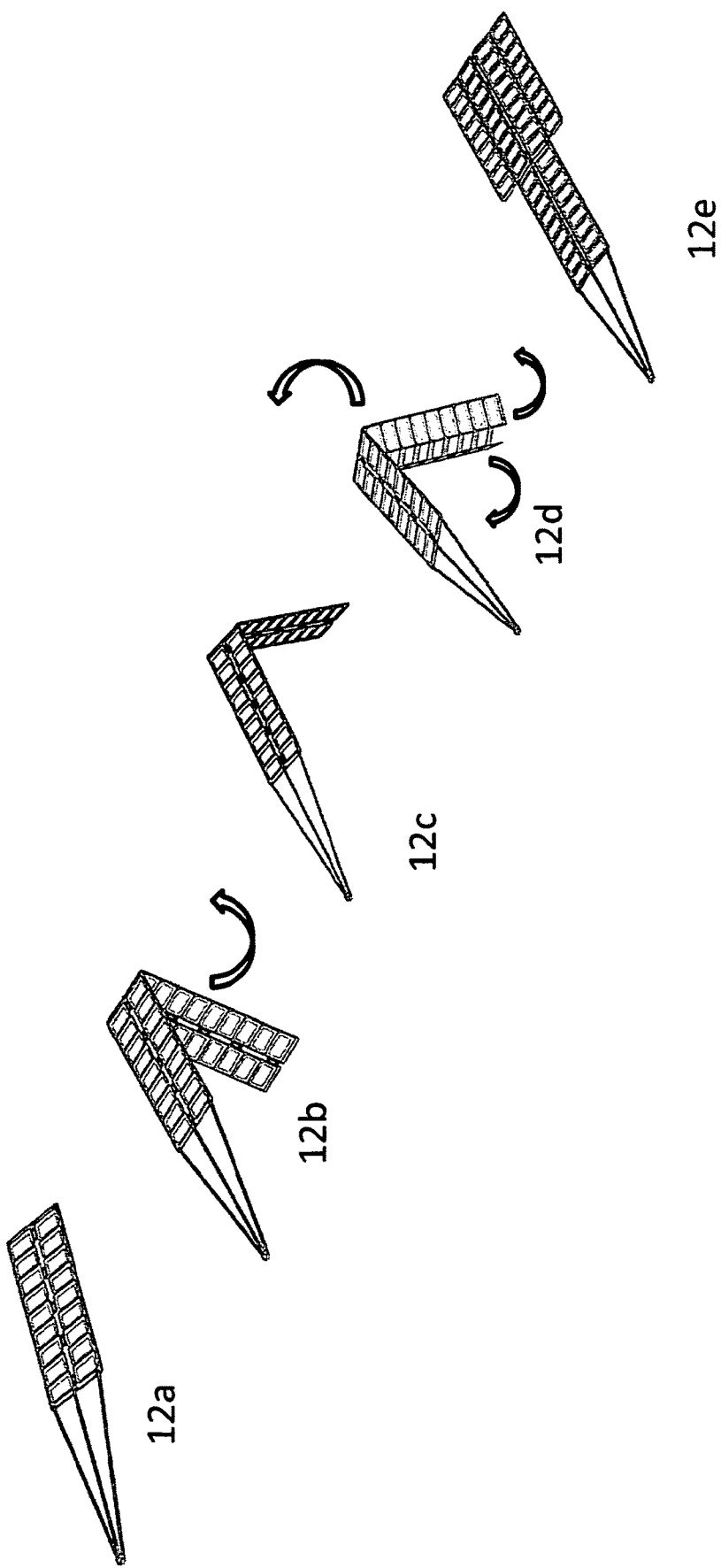

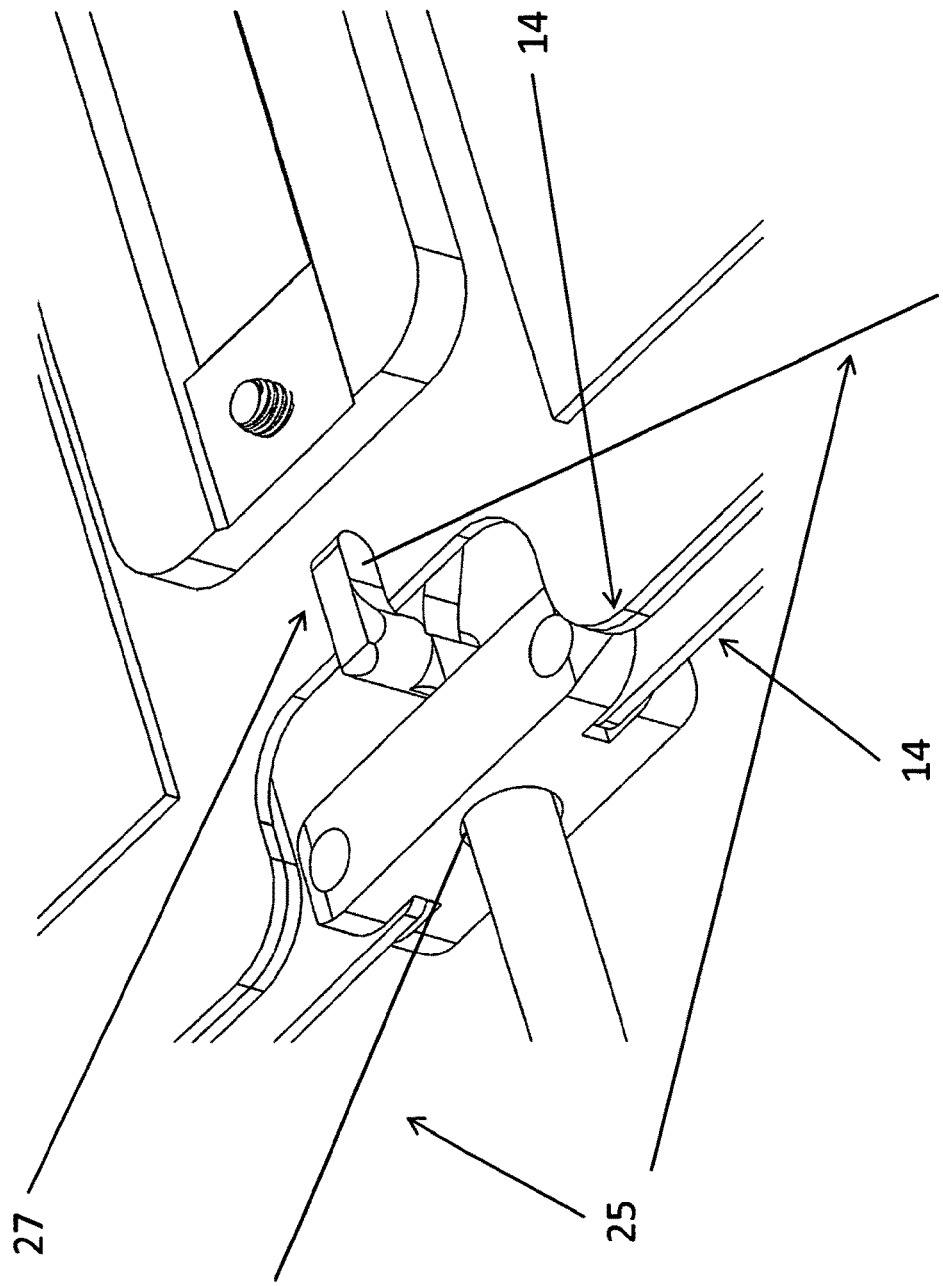

Petal Latch and Lanyards

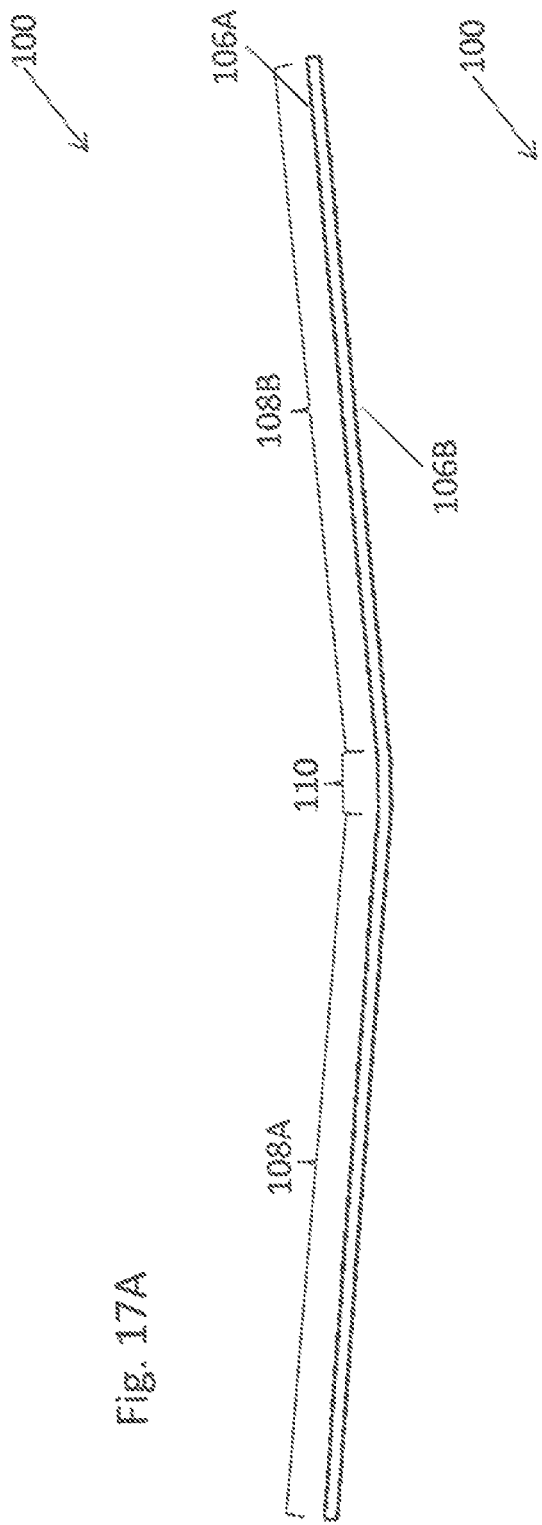
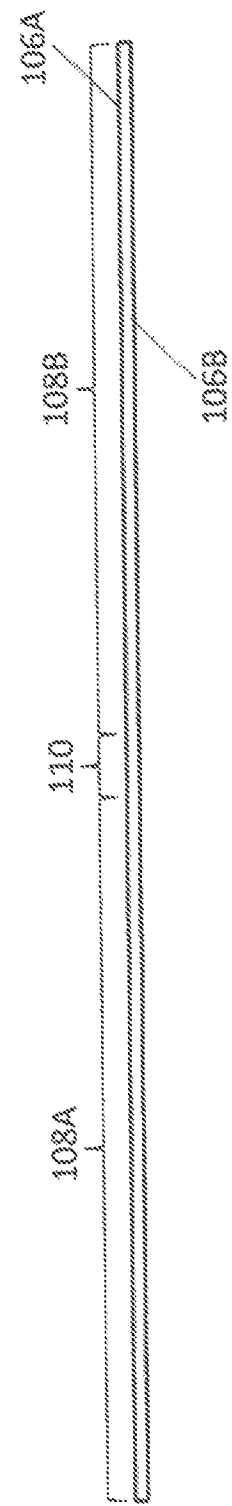
Fig. 17A
Fig. 17B

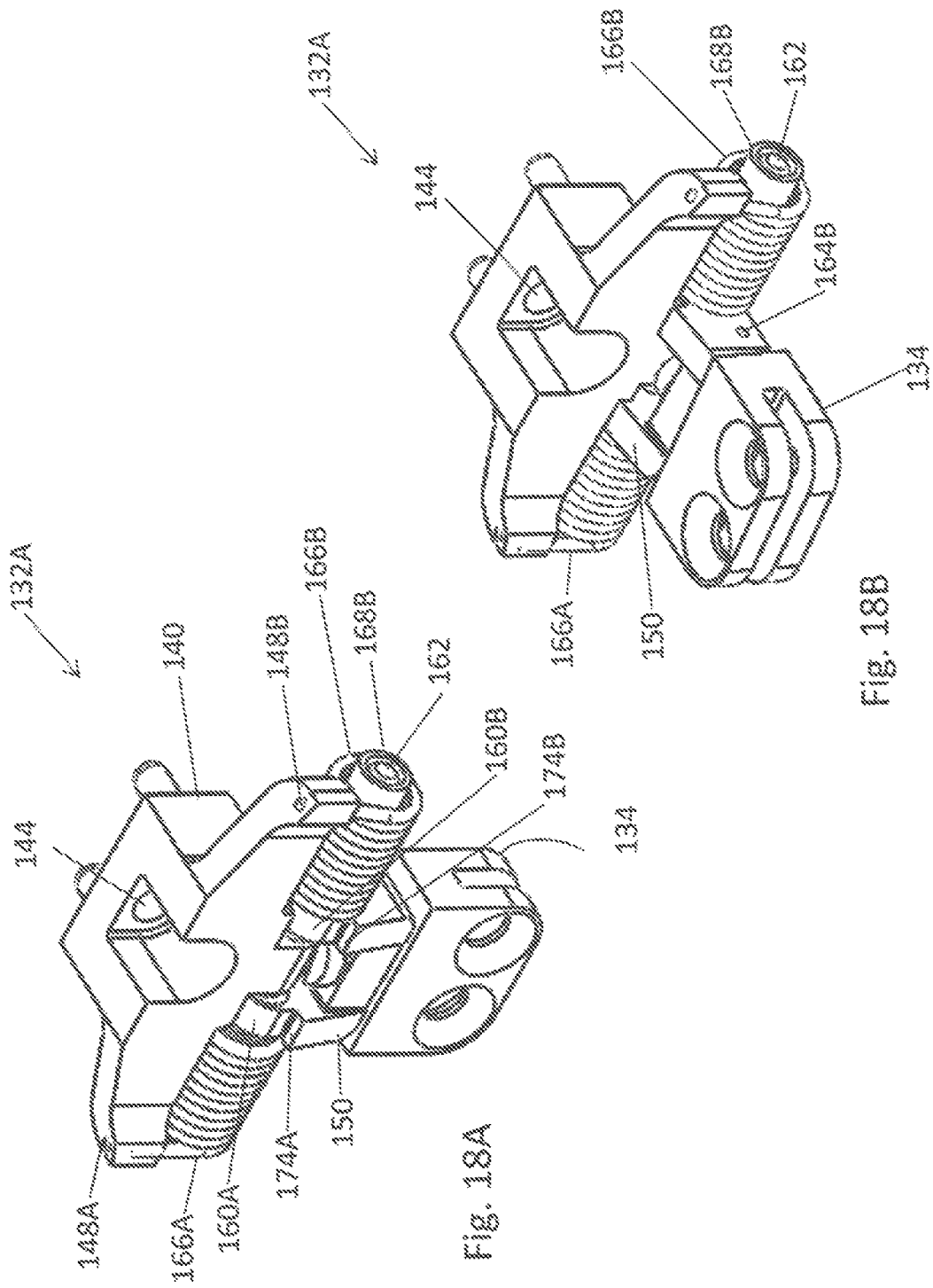

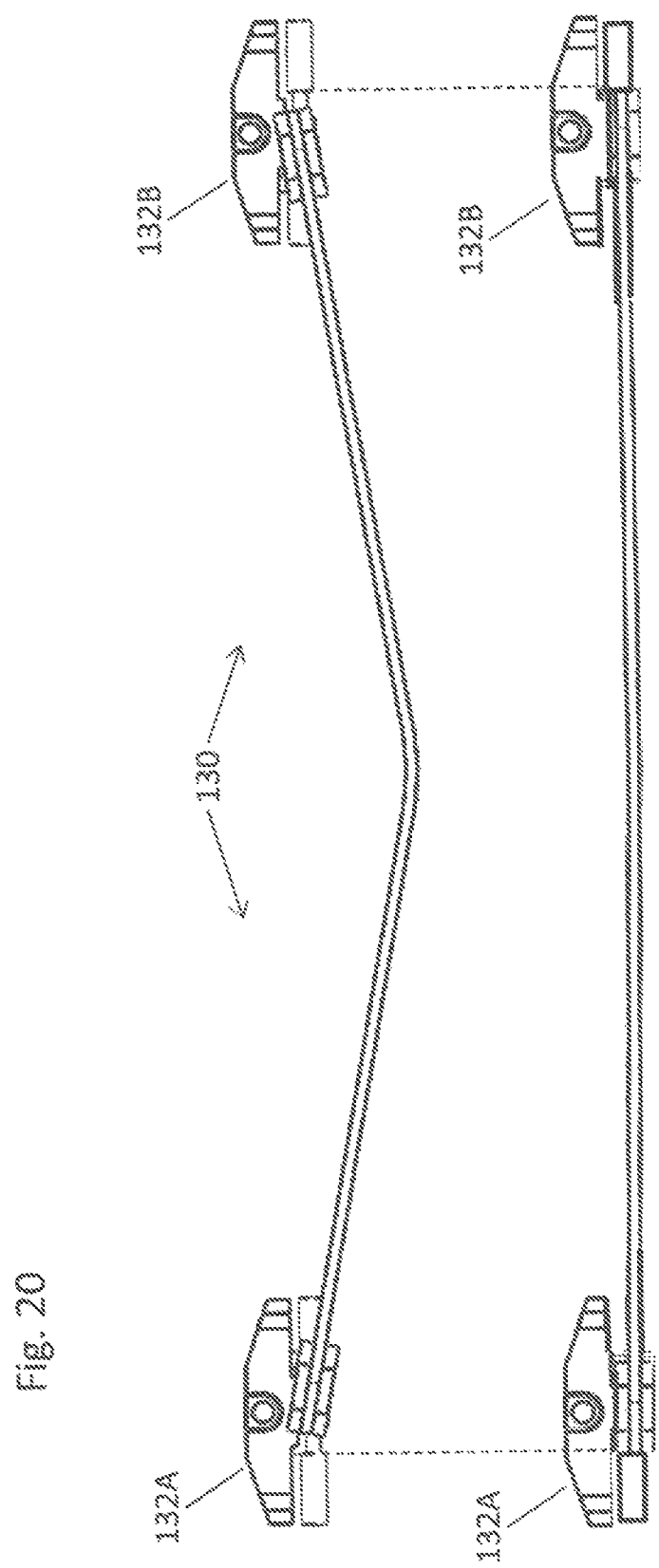

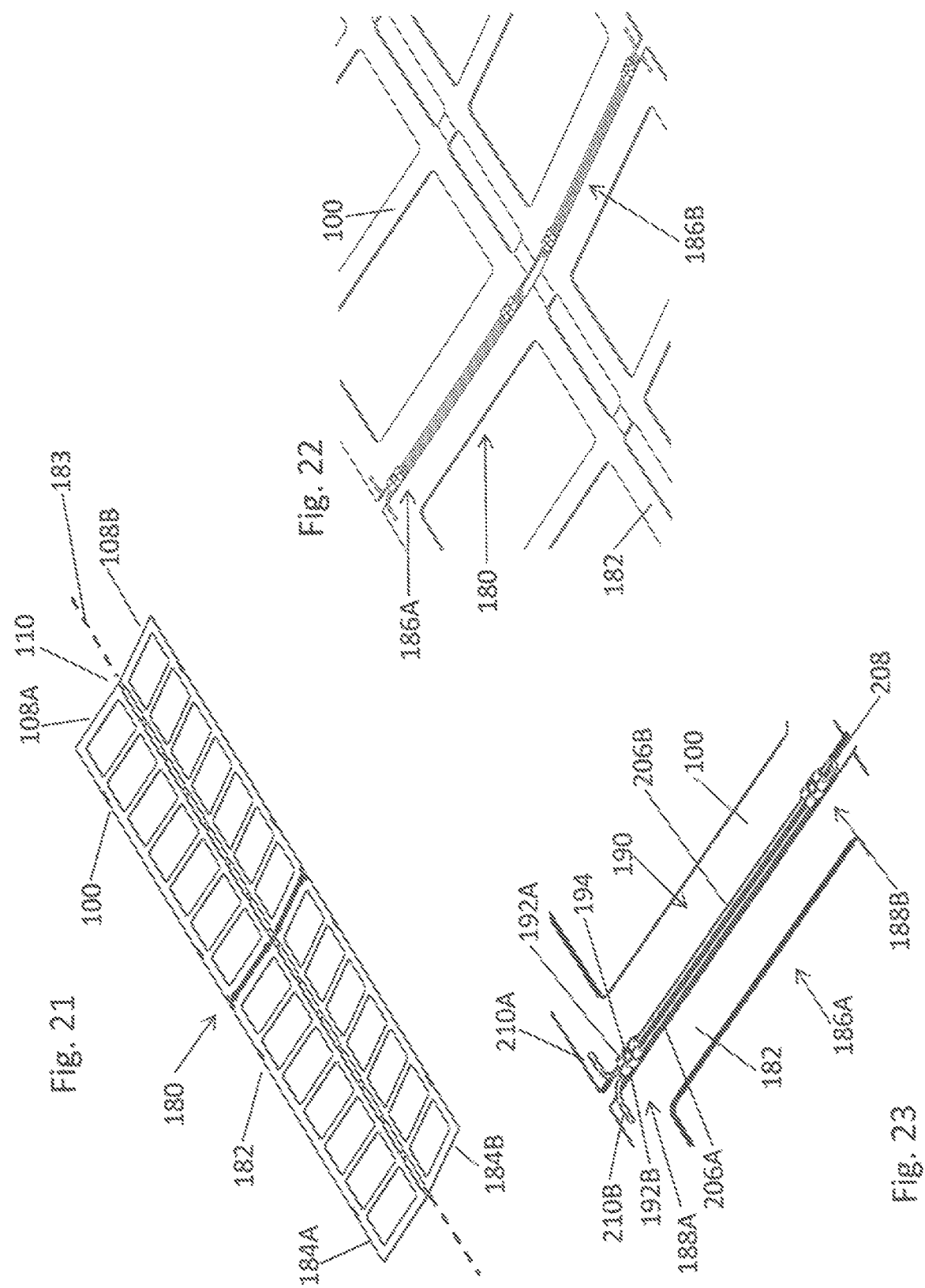

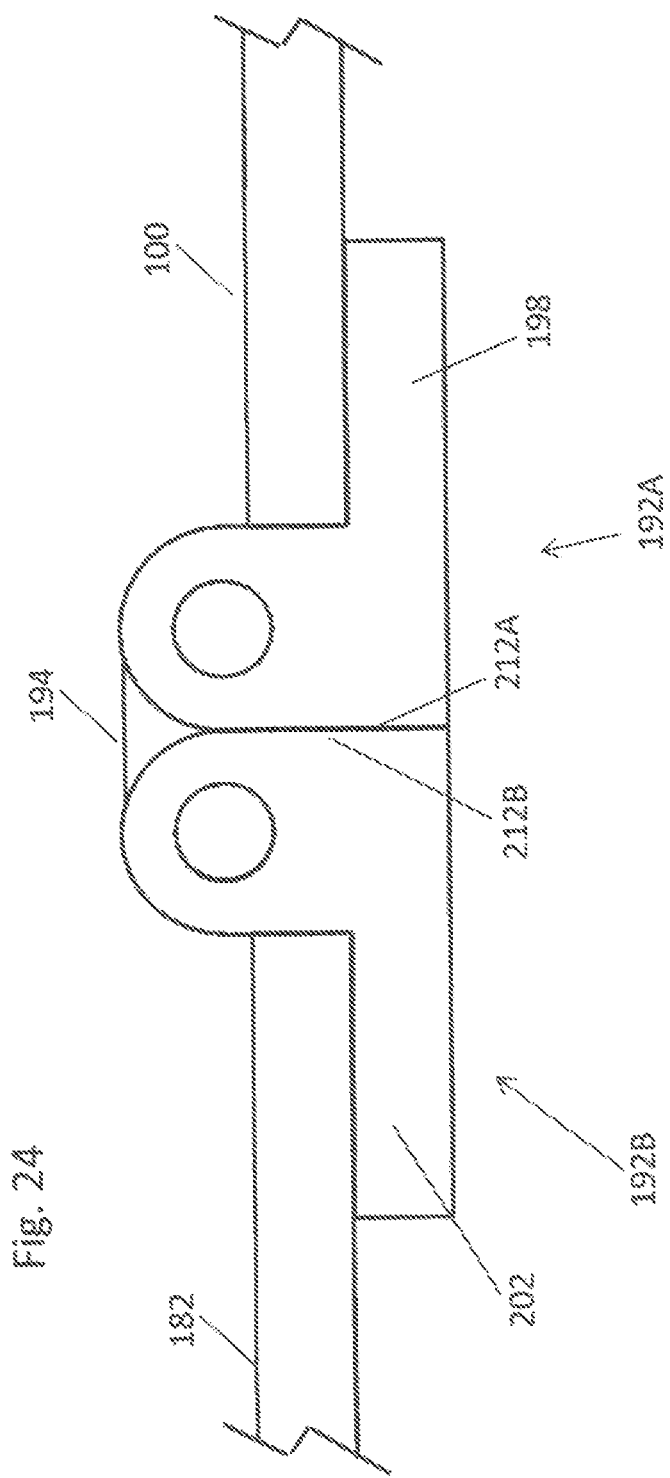

PANEL FOR USE IN A DEPLOYABLE AND CANTILEVERED SOLAR ARRAY STRUCTURE

CROSS REFERENCE TO RELATED APPLICATIONS

This patent application is a continuation-in-part of U.S. patent application Ser. No. 13/199,430, filed Aug. 30, 2011, now U.S. Pat. No. 8,814,099.

FIELD OF THE INVENTION

The invention relates to a deployable and cantilevered solar array structure that has particular utility in association with a spacecraft and, more specifically, to a panel structure used in such a deployable and cantilevered solar array structure.

BACKGROUND OF THE INVENTION

Generally, one type of deployable solar array structure includes one or more panels that each support one or more solar cells and a deployment structure for transitioning the panels from a stowed/undeployed state to an unstowed/deployed state. In the stowed state, the panel/panels is/are typically disposed in a predefined space and orientation such that the solar cells associated with the panel/panels are either not functional or marginally functional. For example, a deployable solar array structure that includes several panels and is associated with spacecraft may have a stowed state in which the panels are disposed in a stack that is situated adjacent to the side of the spacecraft. In such a stowed state, most and potentially all of the solar cells supported by the panels are either non-functional or only marginally functional. In the unstowed/deployed state, the panel/panels is/are in an orientation/orientations such that the solar cell/cells can become functional to the extent required by the particular application. For instance, if the deployable solar array structure has a single panel that is disposed adjacent to a spacecraft, deployment of the panel may involve translating and/or rotating the panel relative to the spacecraft so that the solar cell/cells associated with the panel can be used to produce the power needed by the spacecraft. In the case of a deployable solar array structure comprised of multiple panels each associated with a "petal" structure, the petals are transitioned from the stowed state in which the petal are stacked one on top of another to a deployed state in which one or more of the petals is/are rotated so that each petal occupies a distinct radial space that exposes the solar cell/cells associated with the petal so that the cell/cells can be used to satisfy the power requirement of the spacecraft. In the situation in which a deployable solar array structure comprised of multiple panels that are connected to one another such that the panels can be "accordion" folded to form a stack, the stack of panels is unfolded such that the panels are substantially coplanar with one another and the cell/cells associated with each panel can be used to satisfy the power requirements of the spacecraft.

In many applications, deployable solar array structures that include one or more panels that each support one or more solar cells and a deployment structure for transitioning the panels from a stowed/undeployed state to an unstowed/deployed state support the panel or panels in a cantilever manner. For example, in the case of a deployable solar array structure with a single rectangular panel having two end edges and two side edges that each extend between the two end edges, one of the end edges of the panel is anchored to a support structure. The other end edge and substantially all of the structure between the two end edges is not supported. The cantilever approach avoids the need for other bracing extending between the support structure and the panel. However, the cantilever approach also limits the distance that the panel can extend away from the support structure and, as such, the area of a panel that can support a solar cell or cells. More specifically, as the distance between the supported end of the panel and the free end of the panel increases for a panel made of a given material and having given dimensions, the panel will increasingly bend or deform. This bending or deformation can be significant enough that the solar cell or cells associated with the panel cannot all be positioned to provide the needed power or the panel exceeds its stress limit and fails.

One approach to increasing the distance that a cantilevered panel or group of cantilevered panels can extend from a support structure and the area of the panel or panels that can support a solar cell/cells is to provide a panel that has a high moment of inertia and stiffness when the panel is in the deployed state. An example of this approach is set forth in U.S. Pat. No. 6,147,294 (the '294 patent). In the '294 patent, a cantilevered solar array wing that has a D-shaped cross-section in a deployed state is disclosed. Apparently, the D-shape yields the needed high moment of inertia and stiffness for the wing to extend a substantial distance from a box that supports the wing in a stowed state and is, in use, somehow associated with a spacecraft. The wing comprises five panels. Each of the panels includes an upper surface structure with four corners, a bottom surface structure with four corners, a solar cell supported by the bottom surface, a 180° strain energy type hinge extending between each of the four pairs of corners associated with the upper and bottom surface structures, and three panel-to-panel hinges for connecting each of the five panels to an adjacent panel. When the panel is in the stowed state, the upper surface structure and bottom surface structure are each flat and the 180° strain energy type hinges are each in a strained state with significant stored potential energy. In transitioning from the stowed state to the deployed state, the energy stored in the 180° strain hinges is used to bow the upper surface structure. Due to the stiffness of the bottom surface structure that supports the solar cell, the bottom surface structure remains flat during the transition of the panel between the stowed and deployed states. The bowed upper surface and the flat bottom surface define the D-shaped cross-section that increases the moment of inertia and stiffness of the panel. The panel-to-panel hinges allow several of the panels to be connected in series to realize the solar array wing that has a desired moment of inertia and stiffness that can support solar cells disposed across the bottom surfaces of the panels in a planar fashion.

SUMMARY OF THE INVENTION

The present invention is a Deployable Modular Morphing Solar Array (DMMSA). The array is notionally simple, it uses a spring powered Root Staging and Deployment Mechanism (RSDM) that fan deploys structural elements similar to daisy petals that each perform a sequential secondary deployment. The stowed petals are folded when the system is stowed for launch on a spacecraft and unfold to a more structurally ideal configuration once deployed. The fan deployment moves the petals into position to be MORPHED-Deployed then locates them in positions ideal for gathering sun light. The petal assemblies are composed of a yoke that attaches to a Morphing Modular Solar Power Assembly, or assemblies (DMMSPA) that unfurl to form the petal assemblies upon beginning to fan deploy from the spacecraft. The DMMSA system comprises a Root Staging and Deployment Mechanism (RSDM) mounted to the spacecraft. The RSDM positions the stowed DMMSA 90 degrees from the spacecraft, staging it for fan deployment. Petal assemblies are attached to the RSDM by a yoke structure with each petal assembly having at least one DMMSPA secured thereon. Each DMMSPA elastically morphs to a slight V-configuration once deployed. This elastic flexing of the DMMSPA panel to a V cross section increases the area moment of inertia of the panel by orders of magnitude and hence the petal assemblies deployed natural frequency accordingly.

A launch restraint assembly secures at least one folded petal assembly prior to deployment with the launch restraint assembly pre-loading the petal's DMMSPA(s) into a substantially flat configuration. Upon release of the launch restraint assembly, the DMMSPA's that form each petal assembly elastically morph from the substantially flat configuration into the aforementioned V-configuration.

In addition, the present invention includes a method for deploying the petal assemblies from a spacecraft. The method comprises mounting the RSDM to the spacecraft and securing the yoke of the petal assemblies to the RSDM assembly. Deployment is accomplished by first swinging the un-deployed stack of petals to 90 degrees from the spacecraft then rotating the petal or petals away from the spacecraft in a sequential fan fashion.

Also provided is a panel for use in a deployable and cantilevered solar array structure. The panel comprises first and second planar panel sections and an intermediate section connecting the first and second planar panel sections. The first and second planar panel sections are each adapted to accommodate a connecting structure that connects the panel to another portion of the solar array structure, namely, another panel or a portion of the solar array structure located between the panel and a support structure. The panel is capable of being placed in a deployed state in which the first and second planar panel sections have a V-tent-like shape and a stowed state in which the first and second planar panel sections are substantially coplanar. When the panel is in the deployed state, the intermediate portion of the panel extends in a straight line that is substantially parallel to or collinear with the longitudinal axis of a cantilevered solar array structure, when deployed. Due to the V-tent-like shape, the panel has a high moment of inertia and a high stiffness that, in turn, facilitates the establishment of a large area for supporting a solar cell/cells.

In a particular embodiment, the first and second planar sections and intermediate section are one piece of an elastic material that is formed with the V-tent-like shape of the deployed state. As such, when the panel is in the deployed state, the panel is in a low energy state, i.e., there is little (if any) energy elastically stored in the panel. When energy is applied to the panel to deform the panel such that the first and second planar panel sections transition from the V-tent-like shape of the deployed state to the coplanar orientation of the stowed state, energy is elastically stored by the panel. As such, when the panel is in the stowed state, the panel is in a high energy state relative to the deployed state. This elastically stored energy is used to transition the panel from the stowed state to the deployed state and, more specifically, to transition the first and second planar panel sections from the coplanar orientation of the stowed state to the V-tent-like shape of the deployed state. As such, the elasticity of the panel is used to generate the "spring" energy to transition the panel from the stowed state to the deployed state. This is in contrast to approaches like those shown in the '294 patent where strain energy hinges and the like are used to store the energy needed to transition a structure that is flat and in a low-energy condition in a stowed state to a structure that is bowed and in a high-energy condition in a deployed state.

In another embodiment, at least one solar cell is associated with at least one of the first and second planar panel sections of the panel. Due to the planar nature of the panel sections in the stowed and deployed states and in transitioning between these states, the first and second planar panel sections are each suitable for supporting one or more solar cells. As such, the first and second planar panel sections: (a) transition from being substantially coplanar with one another in the stowed state to a bowed orientation in the deployed state that has a high moment of inertia and high stiffness and (b) are each suitable for supporting a solar cell or cells that need to be mounted to a relatively planar surface that does not flex or deform between the stowed and deployed states to an extent that would damage the cell. In contrast, the panel disclosed in the '294 patent has a curved upper surface that is flat in the stowed state and curved in the deployed state and a bottom surface that supports a solar cell and remains flat in both the stowed and deployed states.

A further embodiment employs a panel with an intermediate section that defines at least one cut-out or hole that causes the intermediate section to preferentially elastically deform relative to the first and second planar panel sections when the panel transitions between the stowed and deployed states. This reduces or limits elastic deformation in the first and second panel sections during the transition between the stowed and deployed states that could adversely affect any solar cells associated with the first and second panels.

One embodiment of the panel includes a hinge that connects each of the first and second planar panel sections to another structure associated with the solar array structure (e.g., another panel) such that the first and second planar sections can rotate relative to the other structure and transition between the stowed and deployed states. If the panel is the only panel in a cantilevered solar array structure or the first panel of a series of concatenated panels that form a cantilevered solar array structure, the other structure could be the anchor or support structure relative to which the panel is cantilevered. For example, the anchor structure could be a surface of a spacecraft. If the panel is a panel in a series of concatenated panels that form a cantilevered solar array structure but not the first panel in the structure, the other structure is one of the other panels in the series of panels. Since the hinge functions in the transition of the first and second planar panel sections between the stowed state and the deployed state, the hinge facilitates rotation about a single axis when the panel sections are in the stowed state and about a pair of non-collinear axes when the planar panel sections are transitioning from the stowed state to the deployed state. The hinge includes a first hinge portion associated with the first planar panel section and a second hinge portion associated with the second planar panel section. Each of the hinge portions provides three degrees of freedom, two rotational degrees of freedom and one translational degree of freedom. One of the rotational degrees of freedom is used in moving the panel or series of panels from a stowed orientation to a deployed orientation. For example, in a single panel cantilevered solar array structure that is disposed substantially parallel to the side of a spacecraft in the stowed orientation and disposed substantially perpendicular to the side of the spacecraft in the deployed orientation, the rotational degree of freedom provided by each of the hinge portions is used when moving the structure from the stowed orientation to the deployed orientation. In a cantilevered solar array structure comprised of multiple panels that are stacked and disposed parallel to the side of a spacecraft in the stowed orientation and perpendicular to the spacecraft when in the deployed orientation or moving towards the deployed orientation, the rotational degree of freedom allows the stack of panels to move from a stowed orientation to or towards the deployed orientation. The other rotational degree of freedom and translational degree of freedom address the situation that each of the hinge portions, in the transition between stowed and deployed states, move from a substantially coplanar orientation to a V-like orientation and move closer together.

Another embodiment of the panel includes a hinge that also connects each of the first and second planar panel sections to another structure associated with the solar array structure (e.g., another panel) such that the first and second planar sections can rotate relative to the other structure and transition between the stowed and deployed states. The hinge includes a first hinge portion associated with the first planar panel section and a second hinge portion associated with the second planar panel section. Each of the hinge portions defines two parallel axes of rotation that can rotate relative to one another. In a specific embodiment, each hinge portion has two barrel structures that each defines one of the two parallel axes of rotation. Each hinge portion also includes a U-shaped torsion bar with two parallel arms. A portion of each arm of the torsion bar is located in one of the barrel structures. The torsion bar provides: (a) energy for rotating the panel relative to another structure and (b) a pin for each barrel structure. When the first and second planar panel sections are in the stowed state, the two pairs of parallel axes of rotation associated with the two hinge portions are substantially collinear. However, when the first and second planar panel sections are in the deployed state, the two pairs of parallel axes of rotation associated with the two hinge portions are substantially non-collinear.

BRIEF DESCRIPTION OF THE DRAWINGS

FIG. 3 is a perspective view illustrating a petal assembly configured with two full DMMSPA's and two flip out solar panels, constructed in accordance with the present invention, with the petal assembly being in the deployed condition;

Figure 4:
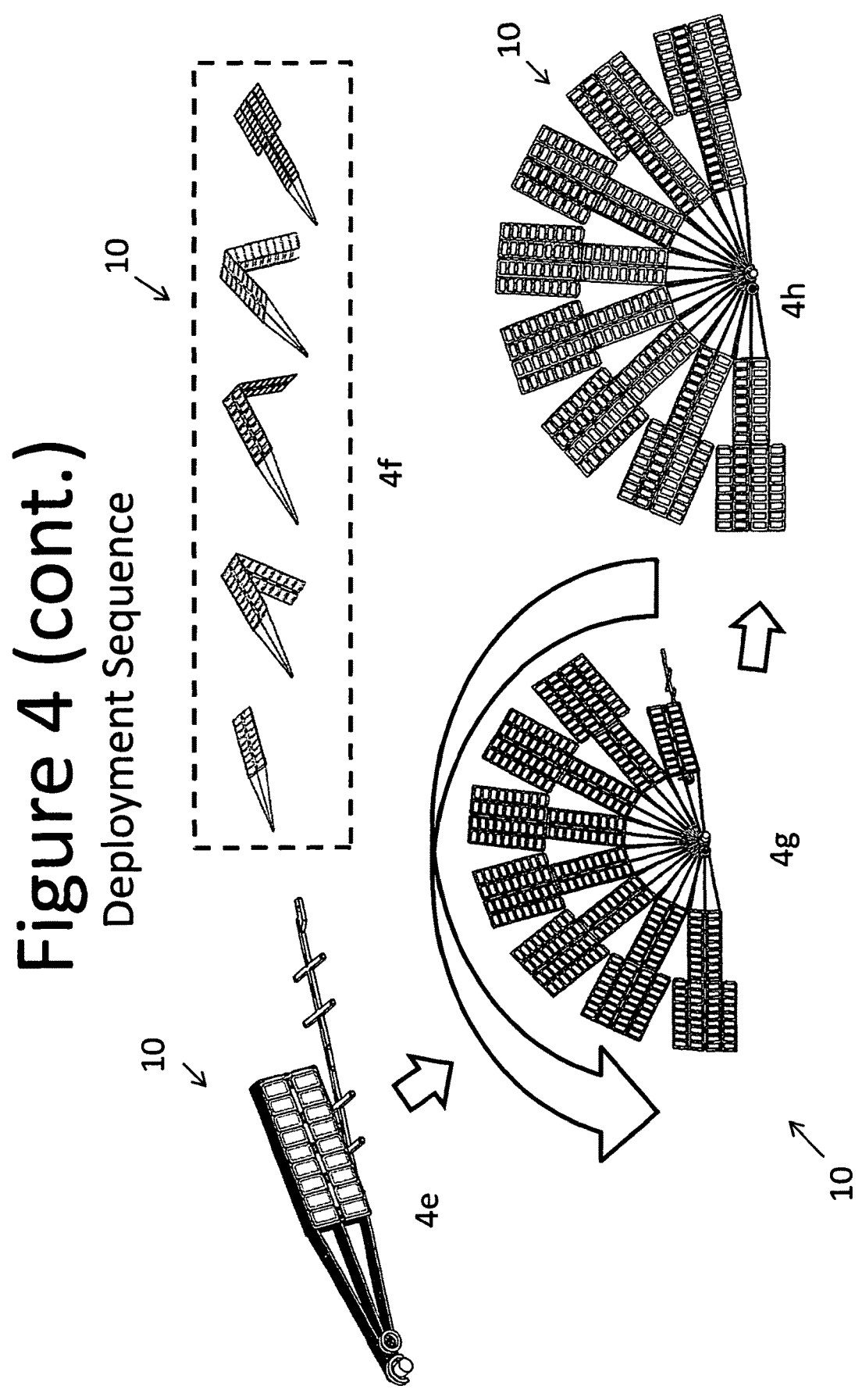

FIGS. 4a-4h are perspective views illustrating a deployment sequence for the DMMSA, constructed in accordance with the present invention;

FIG. 10 is a perspective view illustrating the launch restraint system, constructed in accordance with the present invention;

FIGS. 11a-11c are perspective views illustrating the release sequence for the launch restraint system, constructed in accordance with the present invention;

FIGS. 12a-12e are perspective views illustrating the petal unfolding, constructed in accordance with the present invention;

FIG. 13 is a perspective view illustrating a petal latch and petal lanyard, constructed in accordance with the present invention;

FIGS. 17A and 17B respectively are end views of the embodiment of the panel illustrated in FIG. 15 in a deployed state and a stowed state;

FIGS. 18A-18B respectively are perspective views of a three-degree-of-freedom (TDF) hinge for use with the embodiment of the panel illustrated in FIG. 15 in the stowed state and the deployed state;

FIG. 20 is an end view of the panel with the hinge shown in FIGS. 18A-18B in the deployed and stowed states and illustrate one of the rotational degrees of freedom of the hinge and the translation degree of freedom of the hinge;

FIG. 21 illustrates a pair of panels of the type shown in FIG. 15 coupled by a hinge with the panels and hinge in a deployed state;

FIG. 22 is a close-up perspective view of the hinge shown in FIG. 21 with the panels and hinge in the deployed state;

FIG. 23 is a close-up perspective view of one of the two portions of the hinge shown in FIG. 22;

FIG. 24 is a side view of the portion of the hinge shown in FIG. 22;

DETAILED DESCRIPTION

Figure 1:
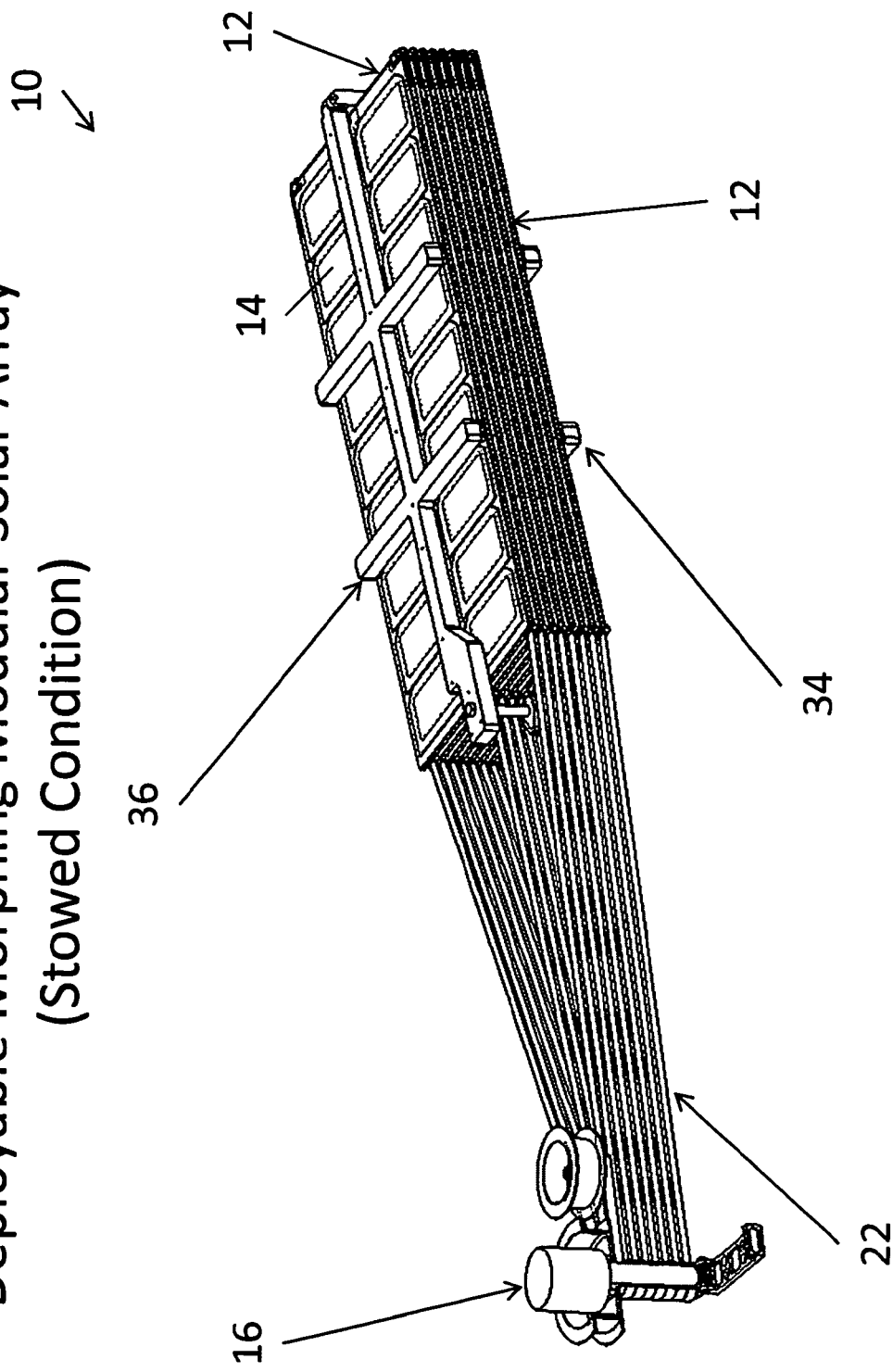
FIG. 1 is a perspective view illustrating the DMMSA, constructed in accordance with the present invention, being in a stowed condition.
Figure 2:
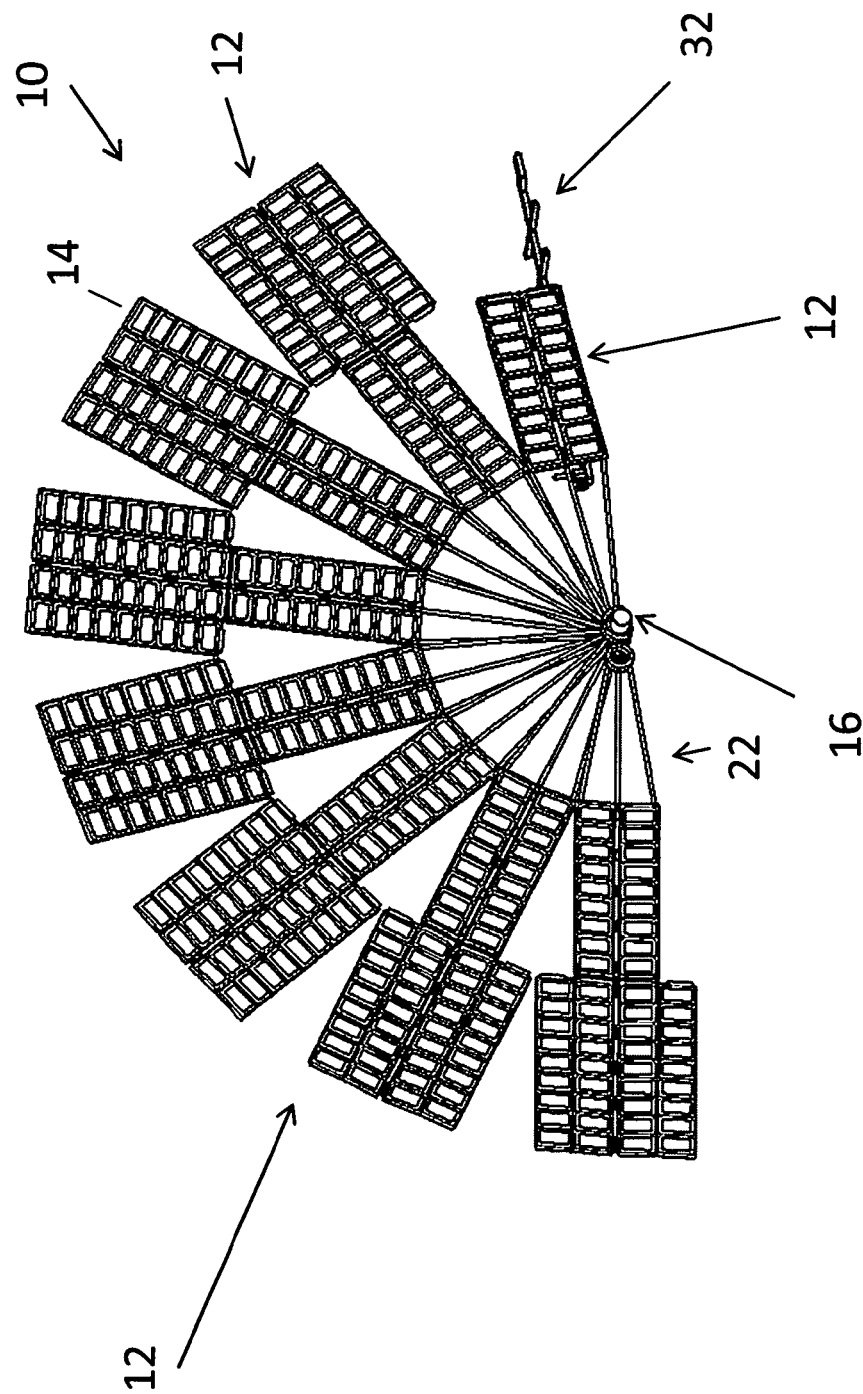
FIG. 2 is a perspective view illustrating an eight petal embodiment of the DMMSA, constructed in accordance with the present invention, being in a deployed condition.
Figure 5:
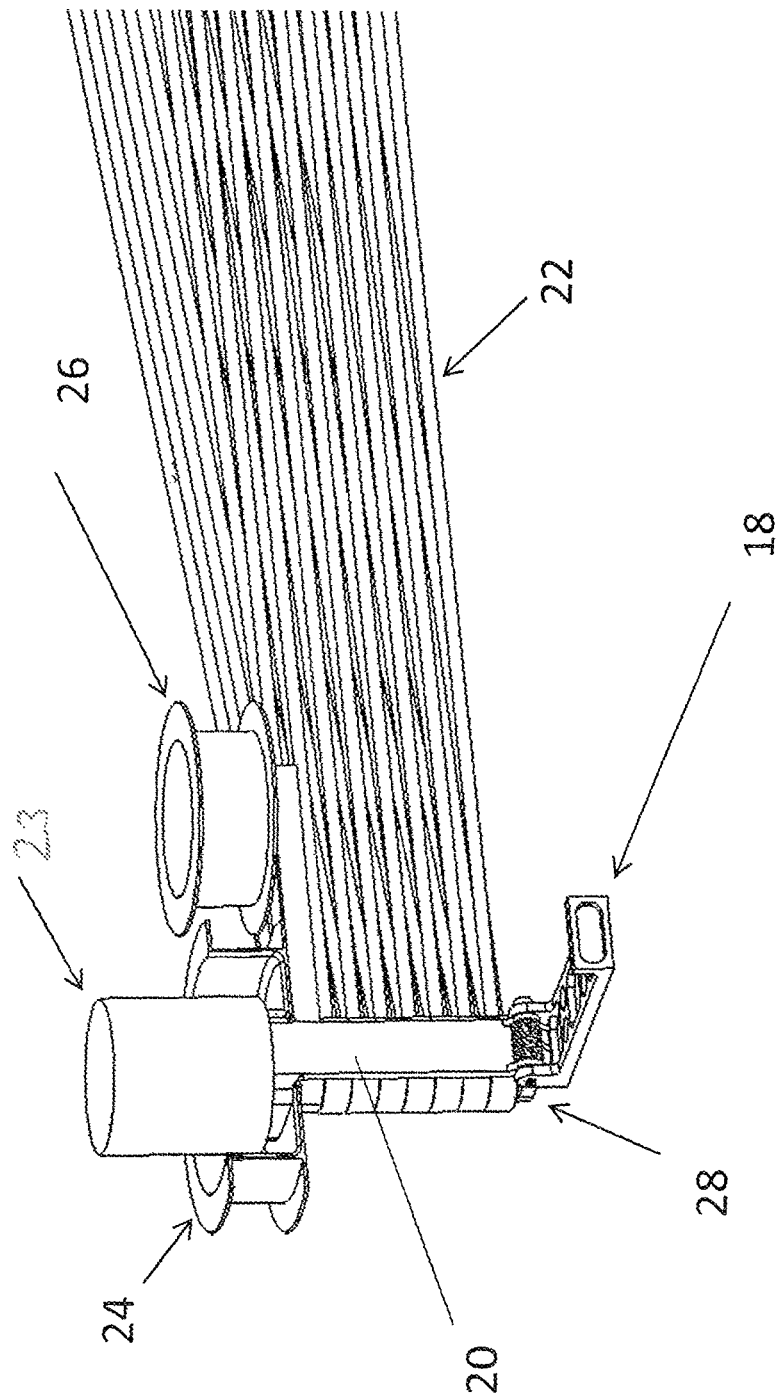
FIG. 5 is a perspective view illustrating the RSDM of the DMMSA, constructed in accordance with the present invention.
Figure 6:
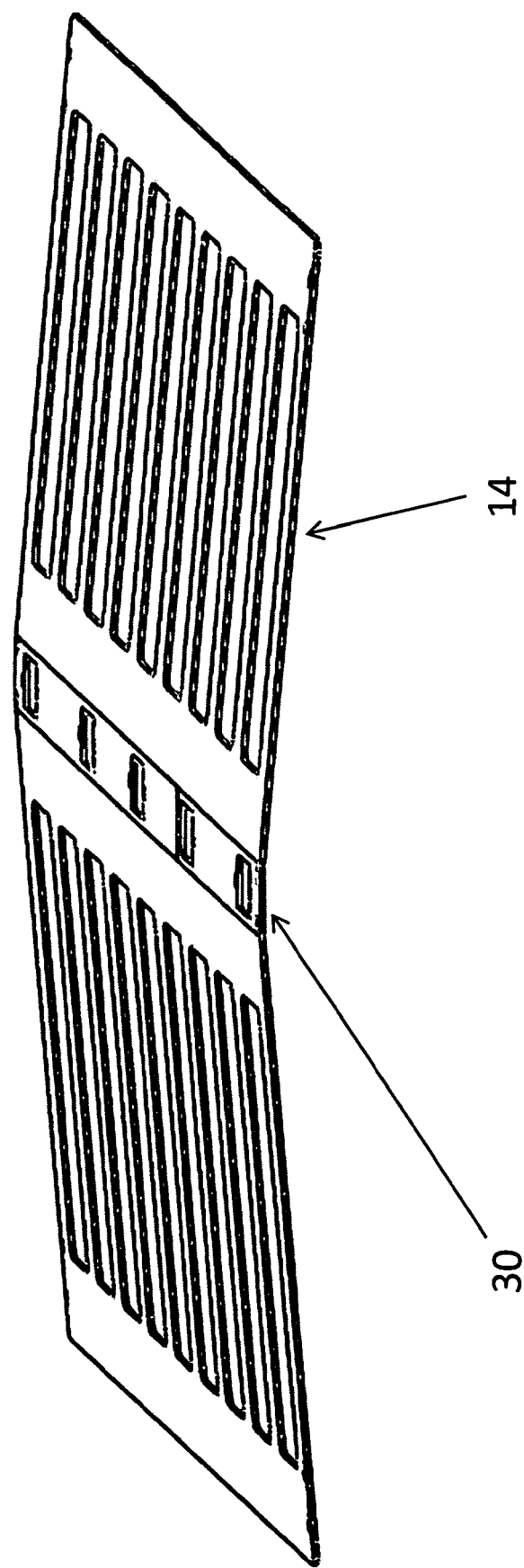
FIG. 6 is a perspective view illustrating a graphite and matrix panel that is the structural element of a DMMSPA, constructed in accordance with the present invention, with the solar panel having a V bow.
Figure 7:
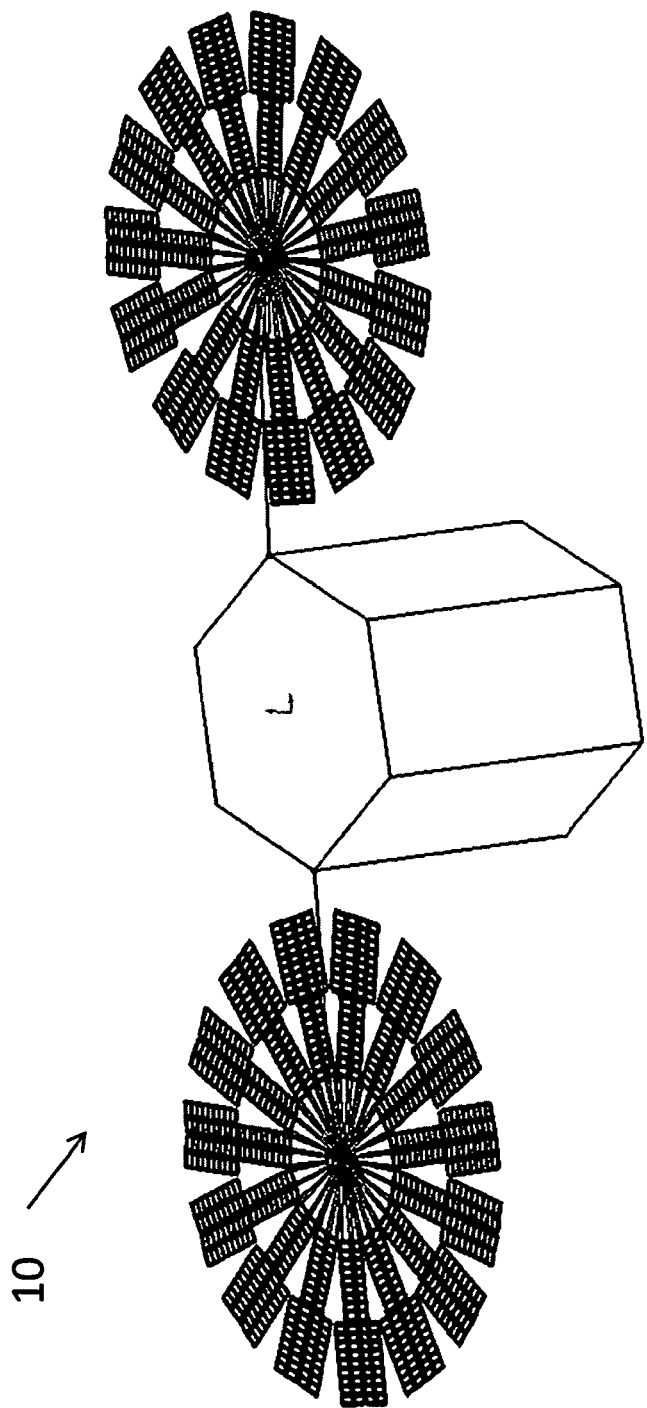
FIG. 7 is a perspective view illustrating a pair of DMMSA's in 16 petal assembly embodiments, constructed in accordance with the present invention, mounted to a spacecraft on a boom and each being configured in a full circle.
Figure 8:
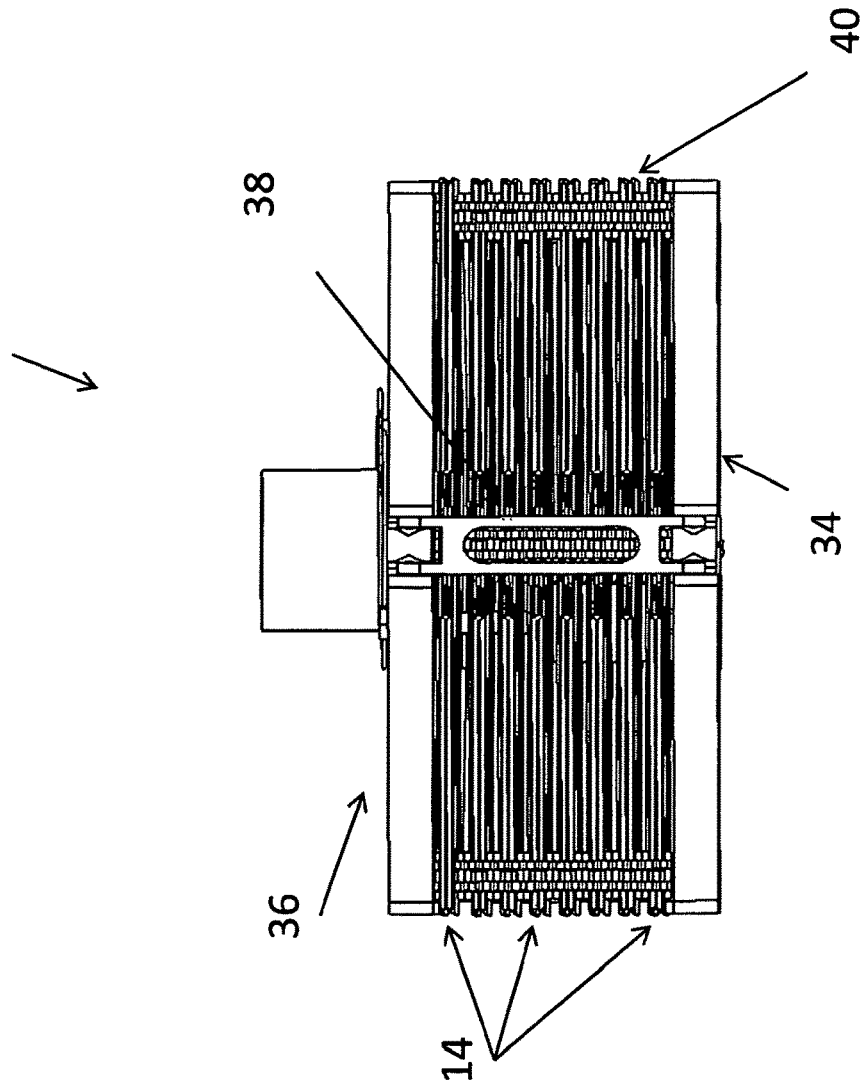
FIG. 8 is an elevational end view illustrating the flattened and stowed DMMSPA's of the DMMSA, constructed in accordance with the present invention.
Figure 9:
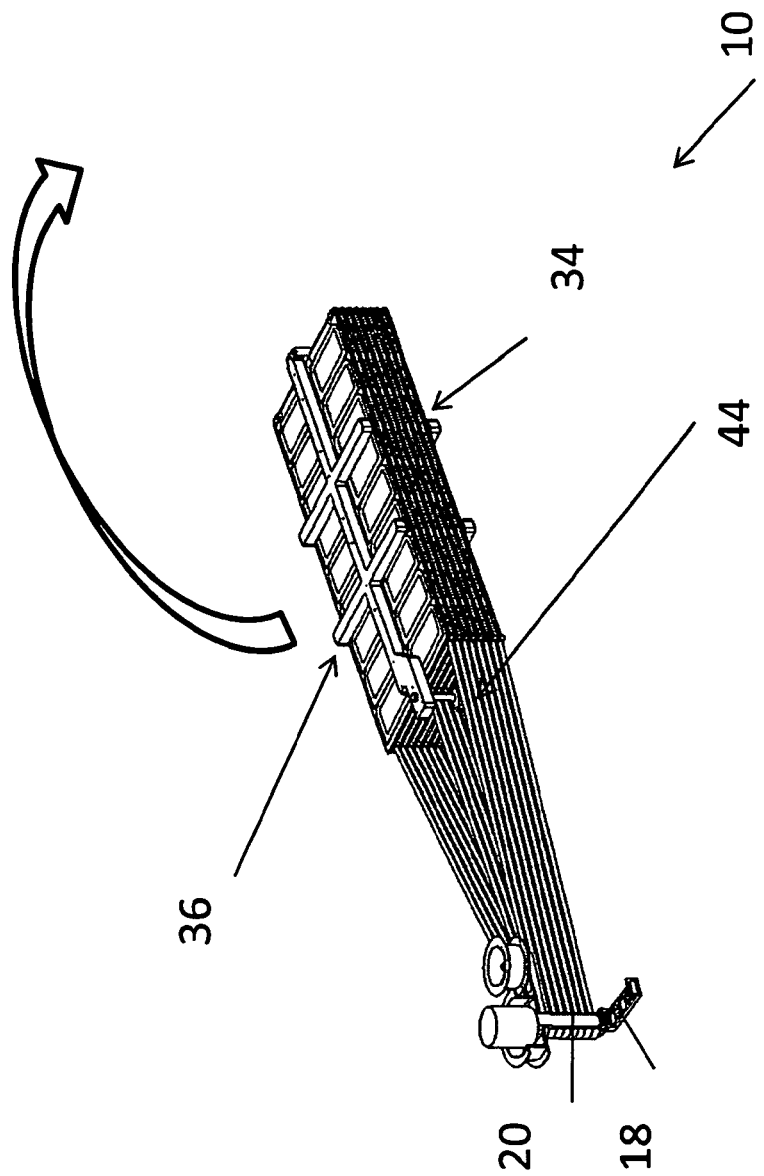
FIG. 9 is a perspective view illustrating DMMSA, constructed in accordance with the present invention, prior to deployment.
Figure 14:
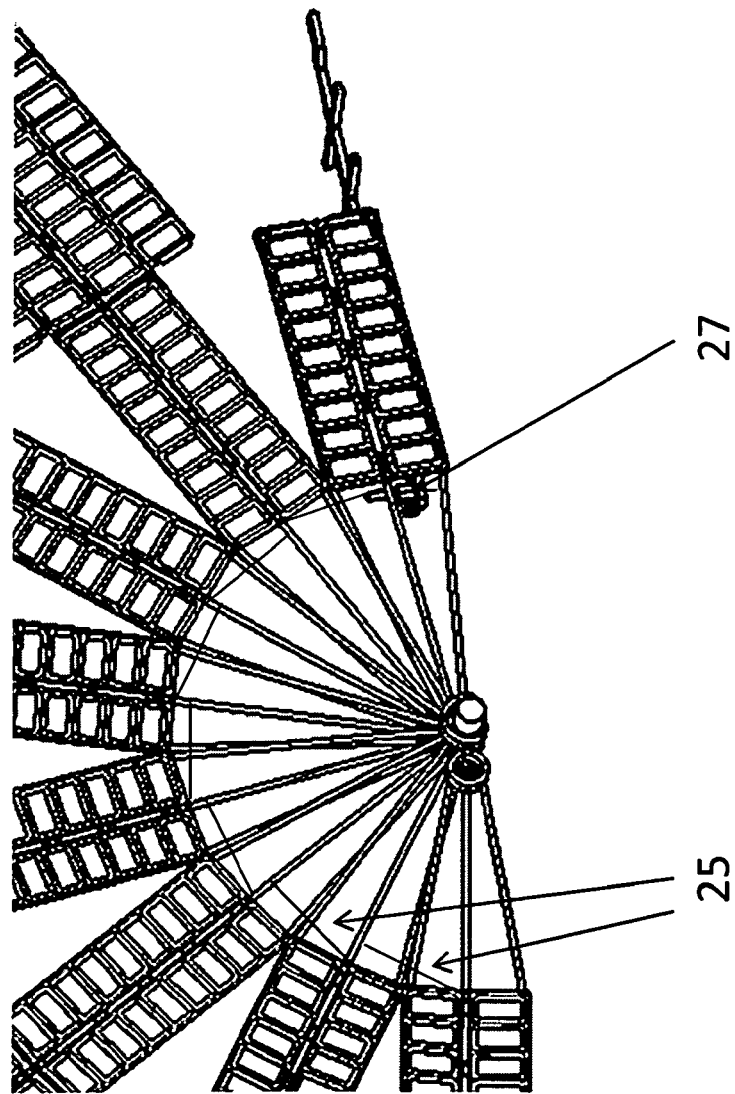
FIG. 14 is a perspective view illustrating the petal latch and the petal lanyard, constructed in accordance with the present invention.

As illustrated in FIGS. 1-14, the present invention is a deployable, structurally morphing, modular solar array system, indicated generally at 10, that increases the deployed stiffness of the modular petal assemblies 12, improving the system's 10 deployed first mode natural frequency, and reducing overall manufacturing costs and mass. As will be described in further detail below, the DMMSA 10 of the present invention uses pre-loaded and flattened DMMSPA panels 14 arranged in petal assemblies 12 (each petal assembly 12 has at least one DMMSPA 14) for surviving the ascent vibration environment. During the deployment sequence the flattening load is released allowing DMMSPA 14 panels that are a part of the petal assembly 12 to flex into a slight V bow. Initially the elastic motion into a V configuration breaks mechanical or electrostatic sticking, that is common once in the outer space environment, and then increases the stiffness of the petal assemblies 12 when they are deployed.

The DMMSA 10 of the present invention includes a Root Staging and Deployment Mechanism (RSDM) 16 that provides two functions. First, the RSDM 16 swings the stowed solar array away from the spacecraft into a staged position for fan deployment. Second, after staging is complete, the RSDM 16 deploys each petal assembly 12 sequentially from the stacked configuration which is followed by the elastic self-deployment of each petal assembly 12. The RSDM 16 includes a spacecraft interface bracket 18 securable to the spacecraft or a stand off boom mounted to the spacecraft and a clevis 20 that is pivotally connected to the bracket 18. When the DMMSA 10 is stowed and secured to the notional spacecraft, the clevis 20 is initially positioned 90 degrees to the spacecraft interface bracket 18. Once the system is released for deployment, the clevis 20 rotates to a position parallel to the spacecraft interface bracket 18 and hence the stowed solar array petals 12 approximately ninety (90°) into a staged position that is perpendicular to the mounting surface on the spacecraft for fan deployment.

In a preferred embodiment of the RSDM 16, a torsion spring 28 connects the spacecraft interface bracket 18 to the clevis 20 biasing the clevis 20 to rotate to a position parallel to the spacecraft interface bracket 18 locating the stowed petals 12 to a position perpendicular to the spacecraft mounting plane. In a preferred embodiment this motion is damped by a viscous rotary damper 23 known to a person skilled in the art. Attached to the clevis 20 is at least one petal yoke 22. The RSDM 16 includes a constant force spring mounted to an output drum 24 and a storage drum 26 to create the torque for deploying the petal assemblies 12 and hence the individual DMMSPAs 14, as will be described in further detail below.

The RSDM 16 of the DMMSA 10 of the present invention deploys the petal assemblies 12 using multi-leaf constant force springs. The constant force springs develop the torque that deploys the first petal assembly 12 which then pulls subsequent petal assemblies 12 sequentially through petal to petal lanyards. Once fully deployed the constant force springs provide sufficient torque to keep the petals 14 of the DMMSA 10 deployed. The torque produced by the RSDM 16 can be fine-tuned by adding or subtracting constant force springs. Actual deployment of the petal assemblies 12 will be described in further detail below.

Each petal assembly 12 of the DMMSA 10 of the present invention is attached to the RSDM clevis 20 with a yoke bracket 23. As mentioned above, in a launch state, the petal assemblies 12 are folded, stacked and held compressed flat so each individual DMMSPA 14 panel is held preloaded and flat. Preloading of the elements of a solar array that support solar cells prevents vibration induced gapping and the spike loads caused by this phenomena. These spike loads can damage solar cells. Conventional solar array systems utilize compressed foam or springs to preload the solar array panels that support the solar cells when stowed adding complexity and mass. The shallow V-shape of the deployed individual DMMSPA panels 14 provides the DMMSA 10 a stable preload in the launch configuration because the DMMSPA panels 14 are elastically deformed to a flat configuration when the DMMSA 10 is stowed. Additionally, the foam often used in conventional systems relaxes during stowage, thus increasing the risk of preload loss and limiting long-term stowage. The use of the elastic deformation of the flattened DMMSPA panels 14 of this invention, when stowed, optimizes mass and cost performance by having fewer parts and is structurally stable.

Each individual DMMSPA structural panel 14 of the DMMSA 10 of the present invention is constructed of cyanate ester and carbon fiber (CFRP) with an integral crease 30 in the center. The thickness of the panel 14 is determined by the inertial loads applied to the system during the rocket launch vibration environment. When the petal assemblies 12 and the individual DMMSPA panels 14 are stowed, the center crease 30 in each individual panel 14 allows the petal assemblies 12 to be elastically flattened. In the flat configuration, the petal assemblies 12 stow efficiently and preload the stowed system. Once the individual DMMSPA is 14 no longer under compressive pressure, it returns to its shallow V-shape. This "morphing" is an approximately ten (10°) degree bend in the individual panel 14 but increases the moment of inertia of the section as previously noted.

The petal assemblies 12 of the DMMSA 10 of the present invention are stacked and sandwiched under a preload by a launch restraint assembly 32. In a preferred embodiment, the launch restraint assembly 32 includes the petal assemblies 12 positioned between a vehicle interface spider 34 on the bottom of the stacked petal assemblies 12 and a launch restraint swing spider 36 on the top of the stacked petal assemblies 12 applying a compressive load through multiple stacks of cup-cone elements 38 attached to the vehicle interface spider 34, all the DMMSPA's 14, and the swing spider 36. When stowed for launch, the DMMSPA's 14 of each petal assembly 12 and its integral cups and cones 38 located in several places along its axial center line transfer shear loads as well as axial loads determinately securing each DMMSPA 14 to the spacecraft through the launch restraint assembly 32. In the stowed configuration, the petal assemblies 12 are additionally stabilized with a multitude of rubber snubbers 40. When stowed and flattened the petal assemblies 12 form a pre-loaded system due to the elastic forces required to flatten the individual DMMSPA's 14.

In addition, the launch restraint assembly 32 of the DMMSA 10 of the present invention includes a spider link member 42 that is positioned between the vehicle interface spider 34 and the swing spider 36 on a distal end of the petal assemblies 12. A hinge connection between the spider link 42 and the swing spider 36 allows the swing spider 36 to be rotated in a general direction away from the stacked petal assemblies 12 in order to stage and deploy the petal assemblies 12 and the individual DMMSPA's 14. A hold down and release bolt 44 is positioned between the vehicle interface spider 34 and the swing spider 36 on the near end of the petal assemblies 12. In conjunction with the spider link member 42, the hold down and release bolt 44 holds the petal assemblies 12 sandwiched between the vehicle interface spider 34 and the swing spider 36. The launch restraint assembly 32 keeps the folded petal assemblies 12 sandwiched, elastically compressing the individual DMMSPA panels 14, and maintaining a stable long-term preload on the DMMSPA's 14 during storage and launch.

The sequence for deploying the petal assemblies 12 and hence the individual DMMSPA's 14 of the DMMSA 10 of the present invention will now be described. As understood by those persons skilled in the art that the deployment sequence described herein is a preferred manner of deployment and other deployment sequences are within the scope of the present invention.

First, as described above, the petal assemblies 12 are in the pre-loaded stored condition mounted to the spacecraft by the RSDM 16 and the launch restraint assembly 32. When the spacecraft reaches a desired position of orbit or travel, the hold down and release bolt 44 is broken or otherwise damaged by known means such as applying power to a heater circuit that breaks the hold down and release bolt 44 thereby releasing the swing spider 36 from the vehicle interface spider 34. The release is low shock and is not instantaneous, thus making it immune from spurious spikes of current due to electrostatic discharge. The released, un-loaded individual DMMSPA's 14, and thus, the petal assemblies 12, then relax into the V-shape thereby separating the cup-cones and causing the swing spider 36 to pivot away from the petal assemblies 12. The petal assemblies 12 are now ready to be staged into the deployed condition.

In order to move the petal assemblies 12 into the deployed condition, the RSDM 16 rotates the stacked petal assemblies 12 approximately ninety (90°) degrees by torque from the torsion spring between the vehicle interface bracket 18 and the clevis 20 of the RSDM 16 to correctly position the petal assemblies 12 relative to the spacecraft. The petal assemblies 12 are now ready to be deployed with the individual DMMSPA's 14 in each petal assembly 12, one at a time, flipping outward and unfolding. The actual amount of flipping and unfolding of the individual petals 12 is dependent on the actual number of individual DMMSPA's 14 that form each petal assembly 12. In a preferred embodiment, the staging and fan deployment of the petal assemblies 12 is damped with dampers to limit speed.

As the first petal assembly 12 rotates away from the spacecraft, at a predetermined point, such as approximately eleven (11°) degrees, a petal to petal lanyard 25 begins pulling the next petal assembly 12 from the stowed stack of petal assemblies 12, releasing a petal latch 27 on the first petal assembly 12 that allows the petal 14 to unfold. Initially, the remaining petal assemblies 12 remain stationary through a ball detent located on each yoke bracket 23 in the RSDM 16. Release of each petal's petal latch 27 allows the petal assembly to unfold. Once the first petal assembly 12 unfolds and flips, it is fanned away from the remaining stacked petal assemblies 12. DMMSPA 14-to-DMMSPA 14 unfolding occurs when the petal latch 27 on each petal assembly 12 is released and petal deployment continues until full deployment. Each adjacent petal assembly 12 is tethered with the petal to petal lanyards 25 to the next adjacent petal assembly causing each successive petal assembly 12 to fan outward with this procedure continuing until all petal assemblies 12 are fanned away from the spacecraft. Now, the petal assemblies 12 create a deployed wing comprised of individual DMMSPA's 14 for powering the spacecraft and/or the spacecraft's equipment. It should be noted that the DMMSA 10 of the present invention is simple to reset by folding and rotating the petal assemblies 12 and replacing the hold down and release bolt 44 with a new replacement bolt.

The DMMSA 10 of the present invention advances the SOA of deployable photovoltaic power systems. There are many potential benefits and impacts to space missions by using the DMMSA 10. The benefits and impacts include, but are not limited to:

1) Lower costs for small satellites requiring high power;
2) Enhancing the capability and utility of satellites;
3) Improving the mass fraction for payloads;
4) Allocating less volume for solar arrays on the stowed spacecraft;
5) Increasing power in the current volume allocation;
6) Varying power by using different number of petal assemblies; and
7) Rapidly reconfiguring for multiple power needs in support of rapidly deployable space missions.

Figure 15:
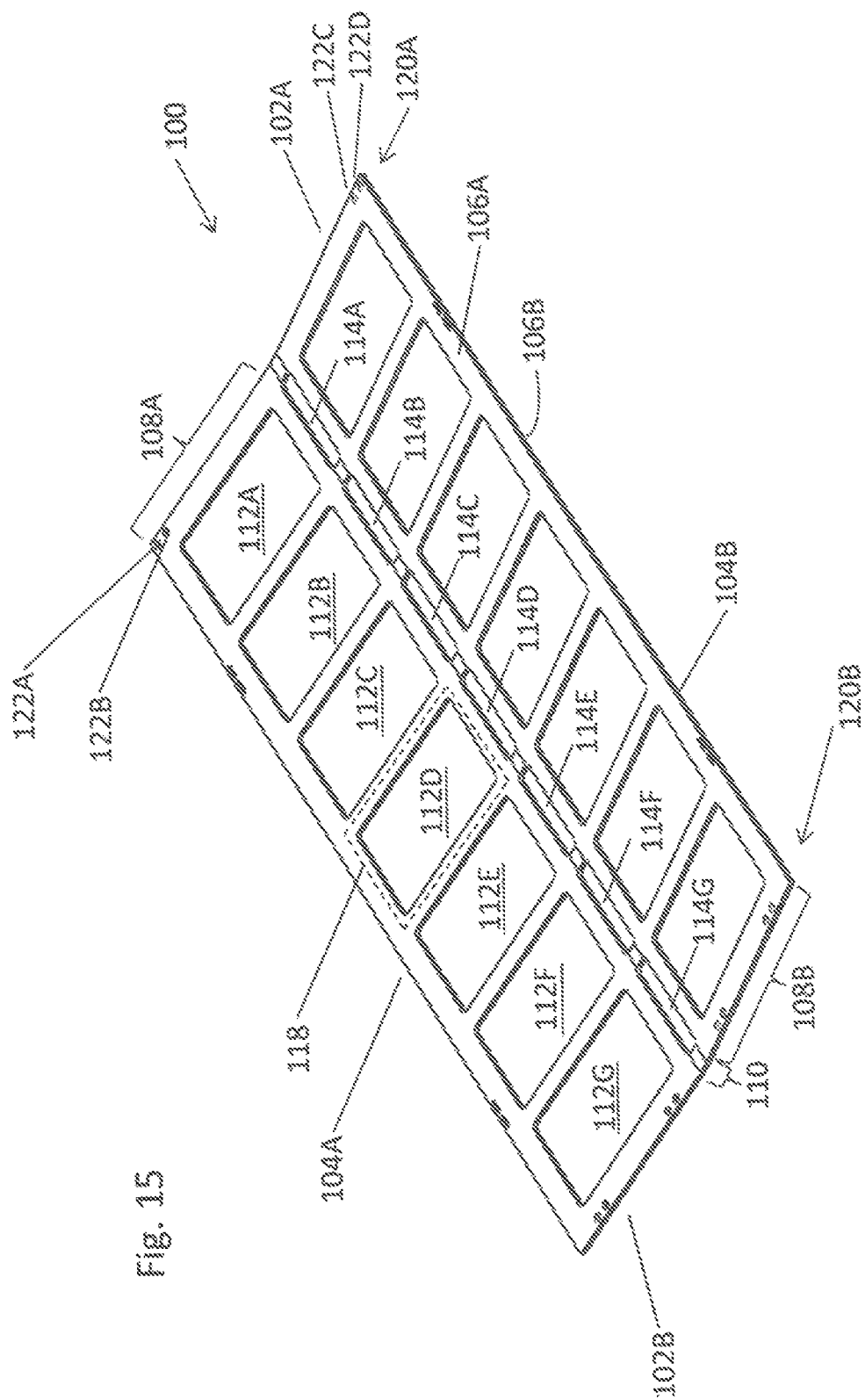
FIG. 15 is a perspective view of an embodiment of a panel suitable for use in a deployable and cantilevered solar array structure.
Figure 16:
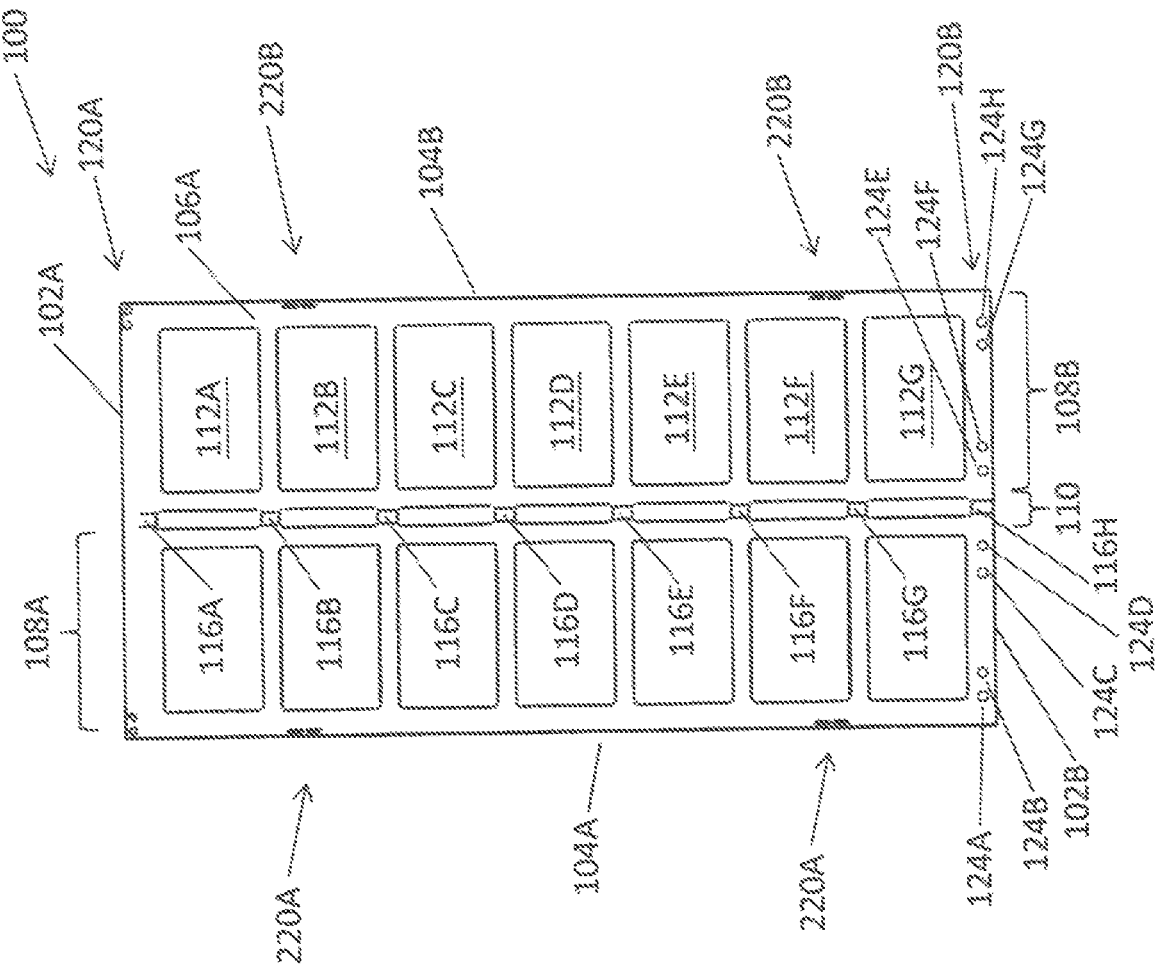
FIG. 16 is a plan view of the embodiment of the panel illustrated in FIG. 15.

With reference to FIGS. 15, 16, 17A, and 17B, a second embodiment of a panel 100 suitable for use or adaptable for use in a deployable and cantilevered solar array structure is described. The panel 100 exhibits a high moment of inertia and a high stiffness that allows the panel to extend farther, or to be used in combination with other panels to extend farther, in a cantilevered solar array structure than would be possible with a comparable planar panel. By being able to extend farther in a cantilevered solar array structure, the panel or combination of panels is capable of providing a greater amount of surface area that can be occupied by solar cells than would be possible with a comparable planar panel. The panel 100 is capable of being used with a broad range of deployable and cantilevered solar array structures. For instance, the panel 100 is capable of being used in deployable and cantilevered solar array structures that only employ a single panel or that employ several of the panels. With respect to solar array structures that employ several panels, the panel 100 can be used in solar array structures in which panels are deployed in a "petal" configuration, such as in system 10. The panel 100 can also be used in solar array structures in which panels are folded in an "accordion" fashion, which is also shown with respect to a single "petal" of the system 10 in FIG. 4f.

The panel 100, in plan view (FIG. 16), has a rectangular shape defined by a first cantilever edge 102A, second cantilever edge 102B, first lateral edge 104A, and second lateral edge 104B. It should be appreciated that other shapes are feasible if needed or required by a particular application. Further, the panel 100 has a first side 106A that supports a plurality of solar cells and a second side 106B. In the deployed state, the first side 106A is concave and the second side 106B is convex. The panel 100 also includes a first planar panel section 108A, a second planar panel section 108B, and an intermediate panel section 110 that separates the first and second planar panel sections 108A, 108B from one another and connects the first and second planar panel sections 108A, 108B to one another. The normal distance between the first side 106A and the second side 106B over substantially the entire extent of the panel 100 is substantially constant.

The panel 100 is capable of being placed in a deployed state characterized by a V-tent-like shape in which the first and second planar panel sections 108A, 108B correspond to the "legs" of the V-tent-like shape and the intermediate section includes the transition between the two legs or the "ridge" of the V-tent-like shape. The end view of the panel 100 in FIG. 17A illustrates the V-tent-like shape. When the panel 100 is in the deployed state and incorporated into deployable and cantilever solar array structure, the intermediate section 110 (which includes the ridge of the V-tent-like shape) extends in a substantially straight line that is parallel or collinear to the longitudinal axis of the cantilever formed upon the deployment of the solar array structure. The V-tent-like shape extending in the direction in which the cantilever extends provides the panel with a high moment of inertia and a high stiffness. In this regard, the V-tent-like shape is relatively shallow with an angle of about 170° between the first and second planar panel sections 108A, 108B and has a moment of inertia that is at approximately twenty-eight times greater than a comparable panel that is planar in its deployed state. It should be appreciated that changing the angle between the first and second planar panel sections 108A, 108B changes the resulting moment of inertia. More specifically, a greater angle increases the moment of inertia and a lesser angle decreases the moment of inertia. It should also be appreciated that a symmetrical V-tent-like shape in which the widths of the first and second planar panel sections are substantially equal is not required to realize a substantial improvement in moment of inertia and stiffness. In this regard, an asymmetrical V-tent-like shape in which the widths of the first and second planar panel sections are different can be used to realize a substantial improvement in moment of inertia and stiffness.

The panel 100 is also capable of being placed in a stowed state characterized by the first and second planar panel sections 108A, 108B being substantially coplanar. The end view of the panel 100 in FIG. 17B illustrates the first and second planar panel section 108A, 108B in the stowed state.

The deployed state of the panel 100, characterized by the V-tent-like shape, is the natural shape that the panel 100 takes in the absence of any force being applied to the panel other than gravity. In the deployed state, little, if any, energy is elastically stored in the panel 100. To place the panel 100 in the stowed state, a force must applied to the panel to elastically deform the panel such that the first and second planar panel sections 108A, 108B adopt the coplanar orientation. This force can be applied by various structures known to those skilled in the art. An example of such a structure is the launch restraint assembly 32. Regardless of the manner in which force is applied to the panel 100 to place the panel in the stowed state, the application of force to the panel 100 elastically deforms the panel and results in energy being elastically stored in the panel. This elastically stored energy is subsequently used to transition the panel 100 from the stowed state to the deployed state in which the panel has the V-tent-like shape.

The ability of the panel 100 to elastically store energy and use this energy to transition the panel between the stowed and deployed states is realized by making the panel 100 from a single piece of material that is capable of elastic deformation and, in deforming, elastically storing energy. As such, the panel 100 is a monolithic structure. Examples of suitable materials include graphite/carbon fiber composite material (e.g., CFRP), fiberglass composite materials (e.g., garolite), and certain metals (e.g., aluminum) to name a few. In the illustrated embodiment, the panel 100 is made of a single piece of graphite/carbon-fiber composite material. The graphite/carbon-fiber composite material is laid down on a form that has the V-tent-like shape and subsequently cured to yield a proto-panel with the V-tent-like shape characteristic of the deployed state of panel 100. The proto-panel is subsequently machined to produce the panel 100 with the various holes shown in FIGS. 15 and 16. The panel 100 retains the V-tent-like shape characteristic of the deployed state of the panel in the absence of any force being applied to the panel other than gravity. In this state, the panel 100 is storing little, if any, energy elastically. Upon application of sufficient force to the panel 100 to transition the panel from the deployed state to the stowed state, the panel stores elastic energy that is subsequently used to transition the panel from the stowed state to the deployed state.

The first and second planar panel sections 108A, 108B each define seven rectangular holes 112A-112G. Each of the holes 112A-112G defines an area over which a solar cell is disposed on the first side 106A of the panel 100. The holes 112A-112G are established in the planar panel section to reduce the mass of the panel and relatedly improve the watts/kg metric, considerations that are typically important in space-related applications. If mass reduction is not a significant consideration, one or more of the holes 112A-112G need not be established in the panel.

The intermediate panel section 110 defines seven holes 114A-114G. One of purposes of the holes is to weaken the intermediate panel section 110 so that the intermediate panel section 110 preferentially elastically deforms relative to the first and second planar panel sections 108A, 108B when the panel is transitioned from the deployed state to the stowed state. As such, elastic deformation in the first and second planar panel sections 108A, 108B to an extent that could damage the solar cells associated with the first and second planar panel section when the panel is in the stowed state and transitions from the stowed state to the deployed state is substantially reduced. It should be appreciated that the establishment of holes 114A-114G in the intermediate panel section 110 may not be necessary if the solar cells employed in the panel are capable of accommodating a substantial amount of bending or flexing. Also, a greater or lesser number of holes and/or holes with different dimensional characteristics can be employed to weaken the intermediate panel section. An alternative approach to weakening the intermediate panel section 110 for preferential elastic deformation is to render part of the intermediate panel section 110 thinner relative to the remainder of the panel.

The seven holes 114A-114G, in addition to weakening the intermediate panel section 110 for preferential elastic deformation, are also positioned relative to the holes 112A-112G associated with the first and second planar panel sections 108A, 108B so to concentrate elastic stress in ligaments 116A-116H that are positioned near the corners of the holes 112A-112G. By concentrating the elastic stress in the ligaments 116A-116H, the likelihood of any stress significantly compromising the adhesive used to attach the solar cells to the panel is significantly reduced.

The panel 100 includes a number of solar cells, one solar cell associated with each of the holes 112A-112G of the first and second planar panel sections 108A, 108B and attached to the first side 106A of the panel. For simplicity, only the outline of a solar cell 118 is shown via a dashed line in FIG. 15.

The panel 100 is also adapted to accommodate connecting mechanisms that connect the panel to other portions of a solar array structure which contribute to establishing or extending the cantilever. In this regard, the panel 100 defines a first cantilever connector interface 120A that is associated the first cantilever edge 106A and a second cantilever connector interface 120B that is associated with the second cantilever edge 106B. Among the possible other portions of a solar array structure to which the panel could be connected by a connection mechanism and that contribute to establishing or extending the cantilever are: (a) a structure that is located between the panel and the support structure (e.g., a hinge, a yoke, like yoke 22), or (b) another panel that extends the length of the cantilever. It should be appreciated that if the panel 100 is the only panel in a particular deployable and cantilevered solar array structure, only one of the first and second cantilever connector interfaces may be necessary to integrate the panel into the structure.

In the illustrated embodiment, the first cantilever connector interface 120A is a first set of holes 122A-122D that accommodate a particular connection mechanism which is used to connect portions of the first and second planar panel section 108A, 108B adjacent to the first cantilever edge 102A to another component of a solar array structure that is associated with establishing or extending the cantilever. Similarly, the second cantilever connector interface 120B is a second set of holes 124A-124H that accommodate a particular connection mechanism which is used to connect the other end of the panel to another component of a solar array structure that is associated with establishing or extending the cantilever. While the first and second cantilever connector interfaces 120A, 120B are each sets of holes that accommodate a portion of a particular connection structure, it should be appreciated that other structures can be used to accommodate different connection mechanisms. Moreover, the first and second cantilever connection interfaces may be specific locations on the panel, rather than structures like holes or elevated sections. For example, a connection interface could be a location or locations on the panel at which a connection mechanism is to be adhesively bonded to the panel.

Figure 19:
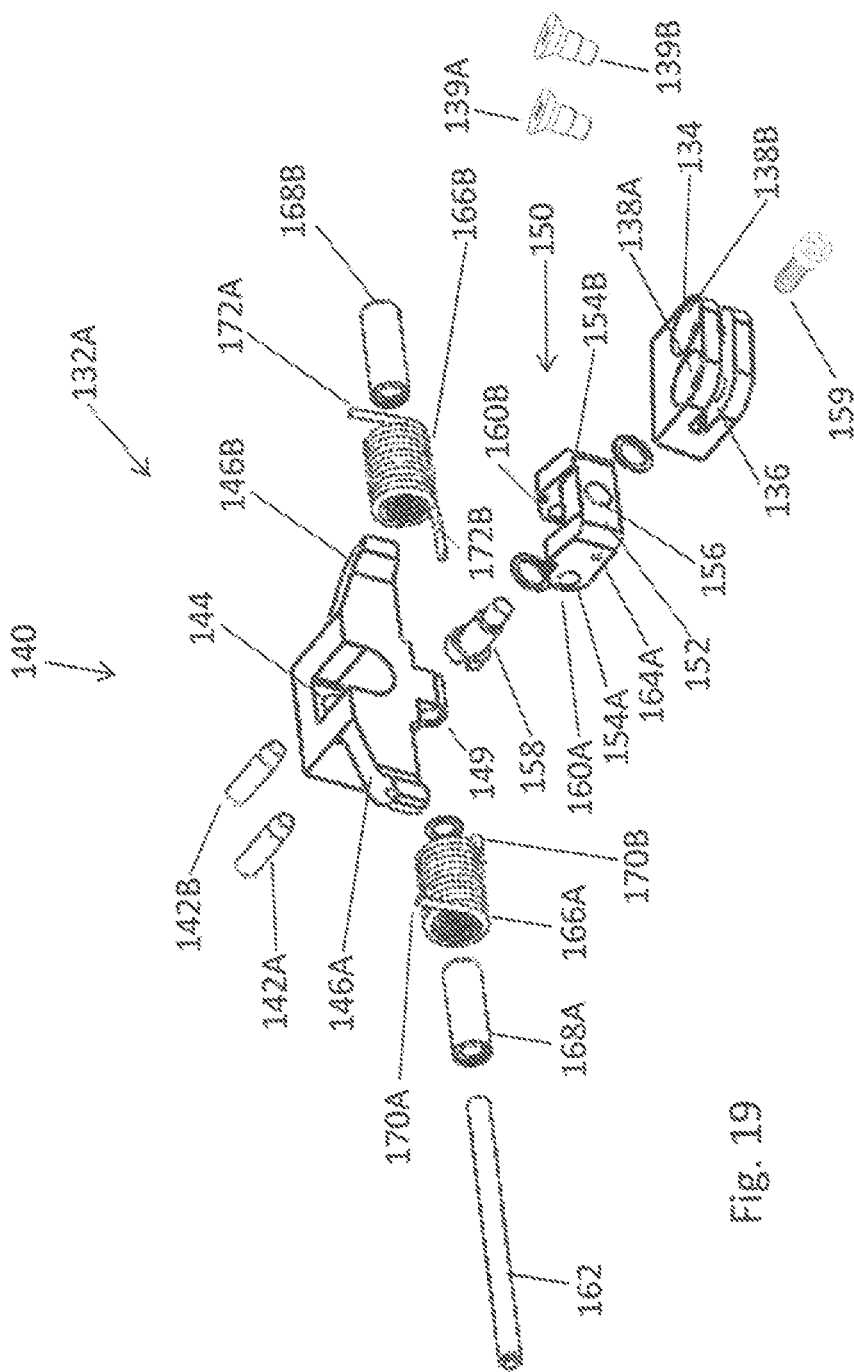
FIG. 19 is an exploded view of the TDF hinge shown in FIGS. 18A-18B.

With reference to FIGS. 18A-18B, 19, and 20, a first embodiment of a hinge 130 that: (a) accommodates rotation of the panel 100 about hinge line that is straight when the panel is in the stowed state and bent when the panel is in the deployed state is described and (b) engages another structure of a deployable and cantilevered solar array structure with components that do not move in any transition between the stowed and deployed states of the panel. As such, the hinge 130 must accommodate three degrees of freedom, two rotational and one translational. One of the rotational degrees of freedom is associated with rotation of the panel 100 relative to the other structure to which the panel is connected by the hinge. The other rotational degree of freedom and the translational degree of freedom are associated with the first and second planar panel sections 108A, 108B rotating with respect to one another between the stowed and deployed states. The translational degree of freedom relates to points on the first and second planar panel sections 108A, 108B that are engaged by the hinge moving towards one another as the panel 100 transitions between the stowed and deployed states. The hinge 130 includes a first hinge portion 132A that is associated with the first planar panel section 108A and a second hinge portion 132B that is associated with the second planar panel section 108B. Each of the first and second hinge portions 132A, 132B has three degrees of freedom. The first hinge portion 132A is substantially identical to the second hinge portion 132B. Consequently, only the first hinge portion 132A is described.

The first hinge portion 132A includes a C-shaped panel interface 134 that engages the panel 100. The panel interface 134 includes a slot 136 that receives the portion of the first cantilever edge 102A associated with the holes 122A, 122B and a pair of holes 138A, 138B that each receive a screw/rivet (not shown) that also passes through one of the holes 122A, 122B to connect the first hinge portion 132A to the panel 100.

The first hinge portion 132A also has a frame 140 that is used to connect the first hinge portion 132A to a support structure and to support other elements of the first hinge portion. The frame 140 includes a pair of alignment pins 142A, 142B that engage corresponding holes in the support structure to situate the first hinge portion 132A at the correct location on the support structure. The frame 140 also defines a hole 144 for receiving a screw (not shown) that fixes the frame 140 to the support structure. The frame 140 includes a pair of arms 146A, 146B. Torsion spring holes 148A, 148B respectively are located in the arms 146A, 146B. Each of the torsion spring holes 148A, 148B receives an end of a torsion spring that is used to provide force for rotating the panel 100 relative to the support structure. A center barrel member 149 associated with the frame 140 defines the rotational axis of the rotational degree of freedom associated with rotating the panel 100 relative to the support structure. It should be appreciated that the frame 140 can be modified to engage another structure in a deployable and cantilevered solar array structure. For example, the frame can be modified to engage another panel with a structure similar to that of the panel interface 134 in place of the alignment pins 142A, 142B and the hole 144.

Also associated with the first hinge portion 132A is an intermediate interface 150 located between the panel interface 134 and the frame 140. The intermediate interface 150 has a U-shape with a cross-member 152 that extends between two legs 154A, 154B. The cross-member 152 defines a hole 156 that is used in connecting the intermediate interface 150 to the panel interface 134 in a manner that allows the panel interface to rotate relative to the intermediate interface 150, thereby providing the second rotational degree of freedom. More specifically, the hole 156 receives a shoulder bolt 158 which, in turn, is received in a threaded hole (not shown) in the panel interface 134. The two legs 154A, 154B respectively define outer barrels 160A, 160B that, in the assembled first hinge portion 132A, are aligned with the center barrel 146 of the frame 140. The distance between the inner surfaces of the outer barrels 160A, 160B is greater than the length of the center barrel 149. An axle 162 passes through the outer barrel 160A, center barrel 149, and outer barrel 160B to connect the intermediate interface 150 and the frame 140 and allow the intermediate interface 150 and panel interface 134 to rotate relative to the frame 140 for the first rotational degree of freedom. Because the distance between the inner surfaces of the outer barrels 160A, 160B is greater than the length of the center barrel 146, the intermediate interface 150 can translate along the axle 162 to provide the translational degree of freedom. This translation is illustrated in FIG. 18 by the dashed lines. The intermediate interface 150 further includes a pair of torsion spring holes 164A, 164B respectively located in the two legs 154A, 154B. Each of the torsion spring holes 164A, 164B receives an end of a torsion spring that is used to provide force for rotating the panel 100 relative to the support structure.

The first hinge portion 132A also includes torsion springs 166A, 166B that are used to provide force for rotating the panel interface 140, intermediate interface 150, and any attached panel or panels about the rotational axis defined by the axle 162 and, more specifically, to rotate the panel interface 140, intermediate interface 150, and any attached panel between a stowed position (FIG. 19A) and a deployed position (FIG. 19B). The axle 162 and spacers 168A, 168B support the torsion springs 166A, 166B. The torsion spring 166A includes ends 170A, 170B that are respectively received by the torsion spring hole 148A of the frame 140 and the torsion spring hole 164A of the intermediate interface 150. Similarly, the torsion spring 166B includes ends 172A, 172B that are respectively received by the torsion spring hole 148B of the frame 140 and the torsion spring hole 164B of the intermediate interface 150. When the first hinge portion 132A and the second hinge portion 132B are in the stowed state (FIG. 19A), the torsion springs 166A, 166B of the first hinge portion 132A and the torsion springs associated with the second hinge portion 132B store sufficient potential energy to rotate the panel interface 140 and any attached panels about the axle 162 such that the panel interface 140 is in the deployed state (FIG. 19B). When the panel interface 140 is in the deployed state, the torsion springs 166A, 166B of the first hinge portion 132A and the torsion springs associated with the second hinge portion 132B store less potential energy than in the stowed state but enough potential energy to maintain the panel interface 140 and any attached panels in the deployed state.

In the illustrated embodiment, the hinge portion 132A accommodates about 90° of rotation between the panel interface 134 and the frame 140 about the axle 162 between the stowed and deployed states. The amount of rotation can be adjusted for particular applications by adjusting the position of the end points of the rotational arc. To elaborate, the rotational position of the panel interface 134 relative to the frame 140 in the stowed state is substantially determined by whatever type of restraint mechanism is being used to hold the panels or panels of a deployable and cantilevered solar array structure in the stowed state (e.g., launch restraint assembly 32). Appropriate modification of the restraint mechanism can be used to change the end point of the rotational arc of the panel interface 134 relative to the frame 140 about the axle 162 in the stowed state. The rotational position of the panel interface 134 relative to the frame 140 in the deployed state is determined by hard stop surfaces 174A, 174B that are associated with the intermediate interface 150 and engage the surface of the frame 140. By moving the hard stop surfaces 174A, 174B closer to or farther away from the cross-member 152, the end point of the rotational arc of the panel interface 134 relative to the frame 140 about the axle 162 in the deployed state can be changed.

Figure 25:
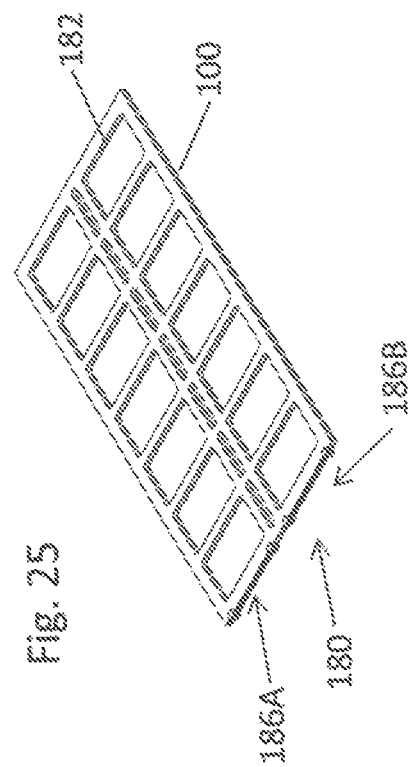
FIG. 25 illustrates the pair of panels and hinge shown in FIG. 21 in the stowed state.
Figure 26:
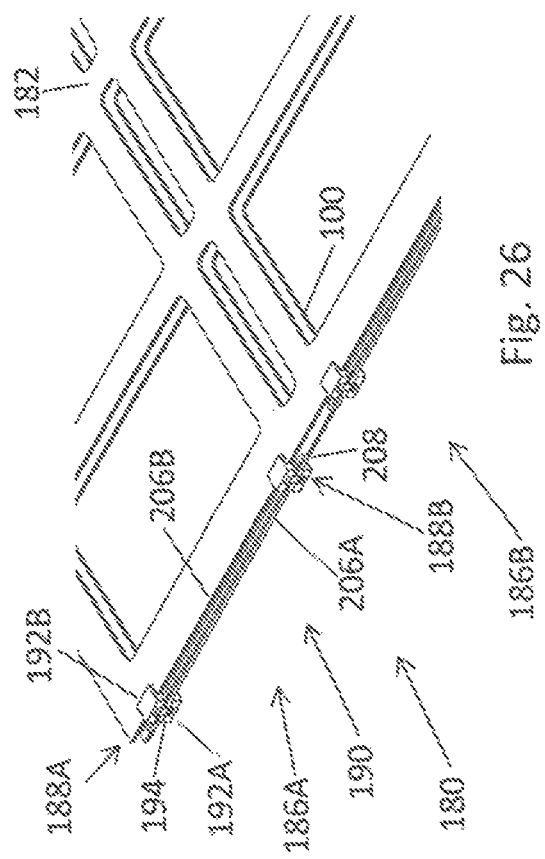
FIG. 26 is a close-up perspective view of a portion of the hinge structure shown in FIG. 25 with the panels and the portion of the hinge in the stowed state.
Figure 27:
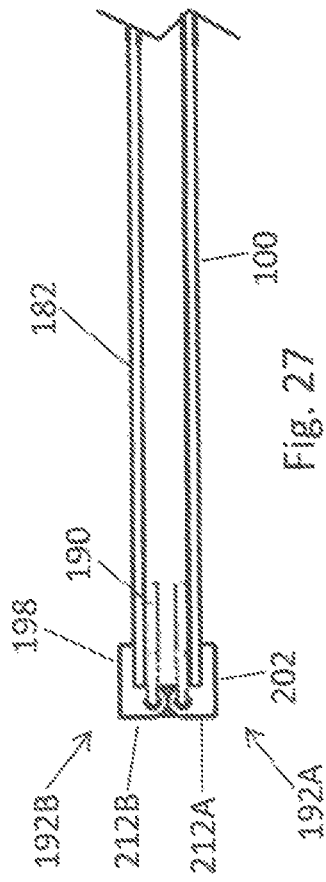
FIG. 27 is a side view of the hinge structure and panels shown in FIG. 23.
Figure 28:
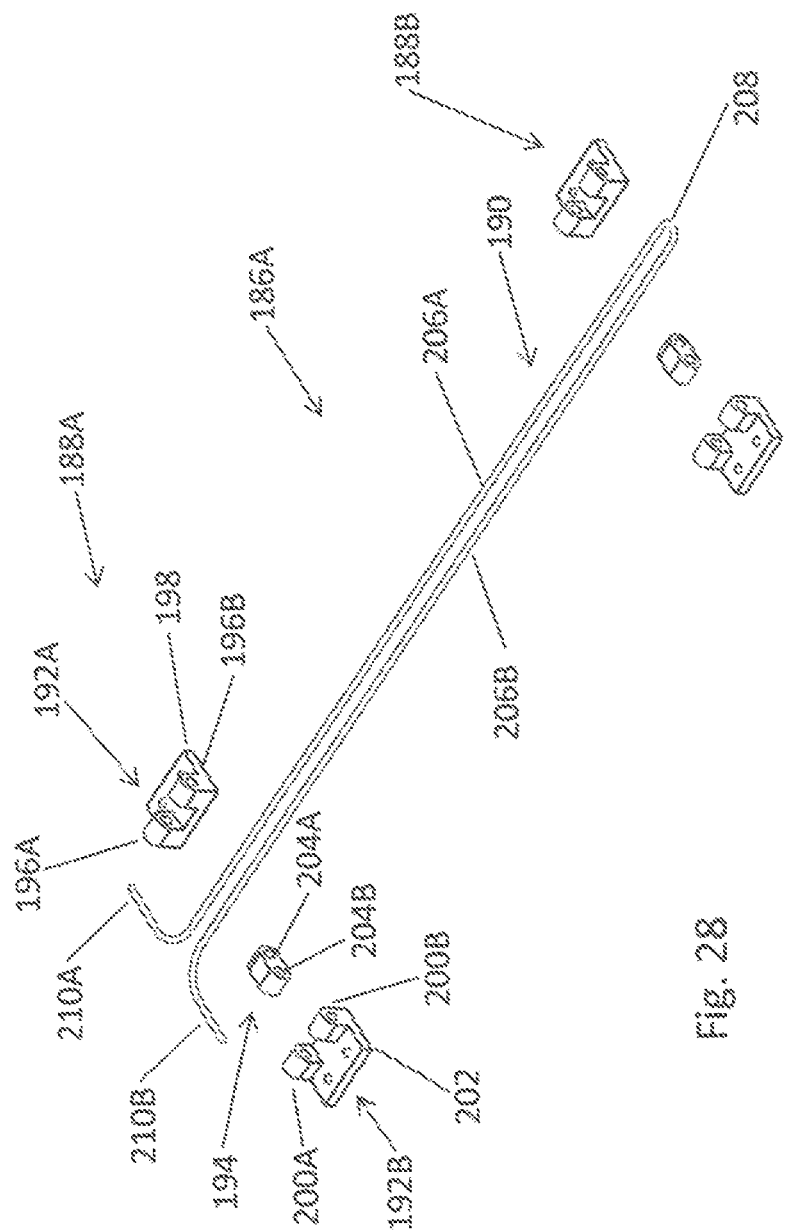
FIG. 28 is an exploded view of the portion of the hinge illustrated in FIGS. 23 and 26.

With reference to FIGS. 21-28, a second embodiment of a hinge 180 that accommodates rotation of the panel 100 about hinge line that is straight when the panel is in the stowed state and bent when the panel is in the deployed state. The hinge 180 is shown connecting the panel 100 with a second panel 182 that has first and second planar panel sections 184A, 184B. It should, however, be noted that the hinge 180 can be adapted to connect the panel 100 to a support structure for a deployable and cantilevered solar array structure or another component of a deployable and cantilevered solar array structure. The combination of the deployed panels 100, 182 connected by the hinge 180, in use, will be supported at one of the two ends to form a cantilevered structure with a longitudinal axis 183. The intermediate panel section 110 of the panel 100 and the corresponding intermediate panel section of the panel 182 extend in a substantially straight line that is parallel to or collinear with the longitudinal axis 183.

The hinge 180 includes: (a) a first hinge portion 186A that is associated with the first planar panel section 108A of the panel 100 and engages a first planar panel section 184A of the second panel 182 and (b) a second hinge portion 186B that is associated with the second planar panel section 108B of the panel 100 and engages a second planar panel section 184B of the second panel 182. The first hinge portion 182A is substantially identical to the second hinge portion 182B. Consequently, only the first hinge portion 182A is described.

The first hinge portion 186A includes first and second sub-hinges 188A, 188B and a U-shaped torsion bar 190. The first sub-hinge 188A and second sub-hinge 188B are substantially identical to one another. Consequently, only the first sub-hinge 188A is described. The first sub-hinge 188A defines two parallel axes of rotation that allow the panel 100 and the second panel 182 to rotate relative to one another. In addition, the two parallel axes of rotation can rotate relative to one another. In this regard, the first sub-hinge 188A includes first and second members 192A, 192B and a center member 194. The first member 192A has a pair of barrels 196A, 196B that defines one of the two axes of rotation and a flange 198 that engages the second side 106B of panel 100 with screws/rivets that pass through holes 124G, 124H of the first panel 100. The second member 192B has a second pair of barrels 200A, 200B that defines the other of the two axes of rotation and a flange 202 that engages the corresponding second side of the panel 182. The center member 194 has two barrels 204A, 204B. The barrel 204A is positioned between and aligned with the barrels 196A, 196B of the first member 192A. The second barrel 204B is positioned between and aligned with the barrels 200A, 200B of the second member 192B. A portion of the U-shaped torsion bar 190 serves as the pin that extends through the barrels 196A, 196B of the first member 192A and the barrel 204A of the center member 194 to define the first axis of rotation. Another portion of the U-shaped torsion bar 190 serves as the pin that extends through the barrels 200A, 200B of the second member 192B and the barrel 204B of the center member 194 to define the second axis of rotation that is parallel to the first axis of rotation. As such, the torsion bar 190 serves both as a pin for the first sub-hinge 188A and as a source of energy to rotate the panels 100, 182 relative to one another. If needed or desirable, a torsion bar that serves as a source of energy for rotating the panels but not as pins for the sub-hinges and separate pins for the sub-hinges is feasible.

The U-shaped torsion bar 190 includes a first and second legs 206A, 206B that are substantially parallel to one another, a U-section 208 that extends between the ends of the first and second legs 206A, 206B and connects the legs to one another, and ears 210A, 210B that respectively extend from the other ends of the first and second legs 206A, 206B and respectively engage the panel 100 and panel 182. When the panel 100 and panel 182 are in the stowed state (FIG. 25), the torsion bar 190 associated with the first hinge portion 186A and the torsion bar associated with the second hinge portion 186B store sufficient potential energy to rotate the panels 100, 182 relative to one another. When the panel 100 and panel 182 are in the deployed state (FIG. 21), the torsion bar 190 associated with the first hinge portion 186A and the torsion bar associated with the second hinge portion 186B store less potential energy than in the stowed state but enough potential energy to maintain the panels 100, 182 in the desired orientation to one another, which is typically in line with one another.

In the illustrated embodiment, the hinge portion 180 accommodates about 180° of rotation of the panel 100 relative to the panel 180. The amount of rotation can be adjusted for particular applications by adjusting the positions of the end points of the rotational arc. The rotational position of the panel 100 relative to panel 180 in the stowed state is substantially determined by whatever type of restraint mechanism is being used to hold the panels or panels of a deployable and cantilevered solar array structure in the stowed state (e.g., launch restraint assembly 32). Appropriate modification of the restraint mechanism can be used to change the end point of the rotational arc of the panel 100 relative to pane 180. The rotational position of the panel 100 relative to panel 180 in the deployed state is determined by hard stop surfaces 212A, 212B respectively associated with flanges 198, 202. By changing one or both of the hard stop surfaces 212A, 212B, the end point of the rotation arc of the panel 100 relative to panel 180 can be changed so that the panels 100, 180 do not line up with one another but are at an angle to one another.

The panel 100 is also adapted to accommodate connecting mechanisms that connect the panel to other portions of a solar array structure which laterally extend the structure but do not substantially contribute to establishing or extending the cantilever. In this regard, the panel 100 defines a first lateral connector interface 220A that is associated with the first lateral side 108A and a second lateral connector interface 220B that is associated with the second lateral side 108B. The other portions of the solar array structure to which the panel may be connected by a connection mechanism that utilizes one of the first and second lateral connector interfaces 220A, 200B and do not contribute to establishing or extending the cantilever are other solar panels (e.g., the one-dimensional solar array panels attached to the side of the outermost panel 14 in FIG. 3). It should be appreciated that if no other portions of a solar array structure are to be connected to the lateral sides 108A, 108B of the panel 100 or only one other portion is to be connected to only one of the lateral sides of the panel, neither or only one of the first and second lateral connector interfaces may be necessary.

The panel 100 is designed to accommodate solar cells that can tolerate a limited amount of bending. Hence, the solar cells are associated with the first and second planar panel sections 108A, 108B that remain substantially planar in the stowed state, the deployed state, and in the transition between the stowed and deployed states. Should the dimensions of a particular deployable and cantilevered solar array structure only require a panel that bends within the tolerance of the solar cells employed on the panel, there may be no need to have a panel with planar panel sections (like the first and second planar panel sections 108A, 108). A panel that is flat in the stowed state and is curved in the deployed state (e.g., a C-like curve) and otherwise similar to the panel 100 is feasible and will provide the greater moment of inertia and higher stiffness of a panel like panel 100. Further, if solar cells are provided that can tolerate a substantial amount of bending (e.g., a flexible solar cell that can be rolled up), a panel that is flat in the stowed state and curved in the deployed state and otherwise similar to the panel 100 is feasible and will provide the greater moment of inertia and higher stiffness of a panel like panel 100.

The foregoing description of the invention is intended to explain the best mode known of practicing the invention and to enable others skilled in the art to utilize the invention in various embodiments and with the various modifications required by their particular applications or uses of the invention.

What is claimed is:

1. A panel structure for use in a deployable and cantilevered solar array structure with, when the solar array structure is deployed, a longitudinal axis that extends from a first end, adapted for fixedly engaging a support structure, to a free end, the panel structure comprising:
    a panel comprising:
        a first planar panel section that is rigid;
        a second planar panel section that is rigid; and
        an intermediate section separating, extending between, and connecting the first and second planar panel sections;
        wherein the panel is capable of being placed in a deployed state in which the first and second planar panel sections and intermediate section have a V-shape with two flat leg portions and a transition portion located between the two flat leg portions, the first and second planar panel sections and the intermediate section store a first amount of elastic energy;
        wherein the first planar panel section forms one of the two flat leg portions of the V-shape, the second planar panel section forms the other of the two flat leg portions of the V-shape, and the intermediate section includes the transition portion of the V-shape;
        wherein the intermediate section extends in a straight line that, when the panel is in the deployed state as part of the deployable and cantilevered solar array structure, is collinear or parallel with the longitudinal axis of the deployed, cantilevered solar array structure;
    wherein the panel is capable of being placed in a stowed state in which the first and second planar panel sections and the intermediate section are side-by-side-by-side coplanar and the first and second planar panel sections and the intermediate section store a second amount of elastic energy that is greater than the first amount of elastic energy stored by the first and second planar panel sections and intermediate section when in the deployed state;
        wherein the first and second planar panel sections are each adapted to accommodate a connecting structure adapted to directly engage a portion of the deployable and cantilevered solar array structure that is not one of the first and second planar panel sections;
    wherein the panel is a single, continuous piece of material with an extent defined by an outer, continuous, closed-loop edge.

2. The panel structure, as claimed in claim 1, further comprising:
    a solar cell operatively connected to one of: (a) the first planar panel section and (b) the second planar panel section.

3. The panel structure, as claimed in claim 1, wherein:
    the intermediate section is elastically deformed when the first and second planar panel sections are in the stowed state relative to when the first and second planar panel sections are in the deployed state.

4. The panel structure, as claimed in claim 1, wherein:
    the intermediate section defines at least one flex hole so that the intermediate section preferentially elastically deforms relative to the first and second planar panel sections when transitioning from the deployed state to the stowed state.

5. The panel structure, as claimed in claim 4, wherein:
    each of the first and second planar panel sections defines at least one solar cell hole that defines a space over which a solar cell can extend;
    wherein the first planar panel section with at least one solar cell hole, the second planar panel section with at least one solar cell hole, and the intermediate section with the at least one flex hole has a rectilinear grid pattern.

6. The panel structure, as claimed in claim 1, wherein:
    the intermediate section changes shape in transitioning between the deployed state and the stowed state; and
    each of the first and second planar panel sections does not change shape in transitioning between the deployed state and the stowed state.

7. The panel structure, as claimed in claim 1, further comprising:
    a first hinge portion operatively attached to the first planar panel section for facilitating rotation of the first planar panel section about a first axis; and
    a second hinge portion operatively attached to the second planar panel section for facilitating rotation of the second planar panel section about a second axis;
    wherein the first and second axes are not collinear when the first and second planar panel sections are in the deployed state;

wherein the first and second axes are collinear when the first and second planar panel sections are in the stowed state.

8. The panel structure, as claimed in claim 7, wherein:
each of the first and second hinge portions has two rotational degrees of freedom and one translational degree of freedom.

9. The panel structure, as claimed in claim 7, wherein:
each of the first and second hinge portions includes a torsion spring.

10. The panel structure, as claimed in claim 7, wherein:
each of the first and second hinge portions includes a hard stop to limit rotation in one of the two degrees of rotational freedom.

11. The panel structure, as claimed in claim 7, wherein:
each of the first and second hinge portions are oriented so as to linearly translate towards the other hinge portion during transition of the first and second planar panel sections between the stowed state and the deployed state.

12. The panel structure, as claimed in claim 7, wherein:
each of the first and second hinge portions includes a torsion bar.

13. The panel structure, as claimed in claim 7, wherein:
the first hinge portion defines a first pair of parallel rotational axes;
the second hinge portion defines a second pair of parallel rotational axes;
wherein the first pair of parallel rotational axes and the second pair of parallel rotational axes are non-parallel when the first and second planar panel sections are in the deployed state;
wherein the first pair of parallel rotational axes and the second pair of parallel rotational axes are collinear when the first and second planar panel sections are in the stowed state.

14. The panel structure, as claimed in claim 7, wherein:
each of the first and second hinge portions includes a hard stop.

15. A panel structure for use in a deployable and cantilevered solar array structure with, when the solar array structure is deployed, a longitudinal axis that extends from a first end, adapted for fixedly engaging a support structure, to a free end, the panel structure comprising:
a panel comprising:
a first planar panel section;
a second planar panel section; and
an intermediate section separating, extending between, and connecting the first and second planar panel sections;
wherein the panel is a single, continuous piece of material with an extent defined by an outer, continuous, closed-loop edge;
wherein the panel is capable of being placed in a deployed state in which the first and second planar panel sections and intermediate section have a V-shape with two flat leg portions and a transition portion located between the two flat leg portions;
wherein the first planar panel section forms one of the two flat leg portions of the V-shape, the second planar panel section forms the other of the two flat leg portions of the V-shape, and the intermediate section includes the transition portion of the V-shape;
wherein the intermediate section extends in a straight line that, when the panel is in the deployed state as part of the deployable and cantilevered solar array structure, is collinear or parallel with the longitudinal axis of the deployed, cantilevered solar array structure;
wherein the panel is capable of being placed in a stowed state in which the first and second planar panel sections are side-by-side coplanar;
wherein the first and second planar panel sections are adapted to accommodate a connecting structure adapted to engage at least one other portion of the deployable and cantilevered solar array structure.

16. The panel structure, as claimed in claim 15, wherein:
when the first and second planar panel sections are in the deployed state, the first and second planar panel sections and the intermediate section store a first amount of elastic energy; and
when the first and second planar panel sections are in the stowed state, the first and second planar panel sections and the intermediate section store a second amount of elastic energy that is greater than the first amount of elastic energy.

17. The panel structure, as claimed in claim 15, wherein:
the intermediate section defines at least one flex hole.

18. The panel structure, as claimed in claim 15, further comprising:
a first hinge portion operatively attached to the first planar panel section for facilitating rotation of the first planar panel section about a first axis; and
a second hinge portion operatively attached to the second planar panel section for facilitating rotation of the second planar panel section about a second axis;
wherein the first and second axes are not collinear when the first and second planar panel sections are in the deployed state;
wherein the first and second axes are collinear when the first and second planar panel sections are in the stowed state.

19. The panel structure, as claimed in claim 15, wherein the panel transitions from the stowed state to the deployed state as the solar array structure is deployed.

20. The panel structure, as claimed in claim 15, wherein the panel is in a fully deployed position in the deployed state.

21. The panel structure, as claimed in claim 15, wherein the solar array structure transitions from the stowed state to the deployed state via application of force resulting from energy elastically stored in the panel in the stowed state.

22. A panel structure for use in a deployable and cantilevered solar array structure with, when the solar array structure is deployed, a longitudinal axis that extends from a first end, adapted for fixedly engaging a support structure, to a free end, the panel structure comprising:
a panel comprising:
a first planar panel section;
a second planar panel section; and
an intermediate section separating, extending between, and connecting the first and second planar panel sections;
wherein the panel is a single, continuous piece of material with an extent defined by an outer, continuous, closed-loop edge;
wherein the intermediate section defines at least one flex hole;
wherein the panel is capable of being placed in a deployed state in which the first and second planar panel sections and intermediate section have a V-shape with two flat leg portions and a transition portion located between the two flat leg portions, the first and second planar panel sections and the intermediate section store a first amount of elastic energy;

wherein the first planar panel section forms one of the two flat leg portions of the V-shape, the second planar panel section forms the other of the two flat leg portions of the V-shape, and the intermediate section includes the transition portion of the V-shape;
    wherein the intermediate section extends in a straight line that, when the panel is in the deployed state as part of the deployable and cantilevered solar array structure, is collinear or parallel with the longitudinal axis of the deployed, cantilevered solar array structure;
wherein the panel is capable of being placed in a stowed state in which the first and second planar panel sections are side-by-side coplanar and the first and second planar panel sections and the intermediate section store a second amount of elastic energy that is greater than the first amount of elastic energy stored by the first and second planar panel sections and intersection when in the deployed state;

wherein the first and second planar panel sections are adapted to accommodate a connecting structure adapted to engage at least one other portion of the deployable and cantilevered solar array structure.

23. The panel structure, as claimed in claim 22, further comprising:
    a first hinge portion operatively attached to the first planar panel section for facilitating rotation of the first planar panel section about a first axis; and
    a second hinge portion operatively attached to the second planar section for facilitating rotation of the second planar panel section about a second axis;
wherein the first and second axes are not collinear when the first and second planar panel sections are in the deployed state;
wherein the first and second axes are collinear when the first and second planar panel sections are in the stowed state.

\* \* \* \* \*